United States Patent
Lopez et al.

(10) Patent No.: US 9,862,166 B2
(45) Date of Patent: Jan. 9, 2018

(54) ADJUSTABLE-HEIGHT INSERTS AND RELATED METHODS

(71) Applicant: The Boeing Company, Chicago, IL (US)

(72) Inventors: Karina Lopez, Anaheim, CA (US); Lee James Keetle, Kingston, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/062,927

(22) Filed: Mar. 7, 2016

(65) Prior Publication Data

US 2017/0253006 A1    Sep. 7, 2017

(51) Int. Cl.
*B32B 3/02*    (2006.01)
*B32B 3/26*    (2006.01)
*B32B 3/12*    (2006.01)
*B62D 33/08*    (2006.01)
*B64C 1/12*    (2006.01)
(Continued)

(52) U.S. Cl.
CPC .............. *B32B 3/266* (2013.01); *B32B 3/12* (2013.01); *B62D 33/08* (2013.01); *B64C 1/12* (2013.01); *B64D 11/00* (2013.01); *F16B 5/01* (2013.01); *B32B 2250/03* (2013.01); *B32B 2605/08* (2013.01); *B32B 2605/18* (2013.01)

(58) Field of Classification Search
CPC ... Y10T 428/22; Y10T 428/24008; F16B 5/01
See application file for complete search history.

(56) References Cited

U.S. PATENT DOCUMENTS

| 2,883,012 A | 4/1959 | Hoffman |
| 3,384,142 A | 5/1968 | Phelan |

(Continued)

FOREIGN PATENT DOCUMENTS

| EP | 0 273 515 | 7/1988 |
| EP | 2 610 505 | 7/2013 |

(Continued)

OTHER PUBLICATIONS

Printout of the Young Engineers, Inc., New Products webpage, available at least as early as Apr. 6, 2015. Downloaded from http://www.youngengineers.com/newproducts.aspx.

(Continued)

*Primary Examiner* — Alexander Thomas
(74) *Attorney, Agent, or Firm* — DASCENZO Intellectual Property Law, P.C.

(57) ABSTRACT

A two-part adjustable-height insert may be installed in a bore of a sandwich panel, such that the adjustable-height insert may be configured to transfer a load to the sandwich panel. The adjustable-height insert may include a first insert part and a second insert part that may be selectively operatively positioned with respect to each other. The adjustable-height insert may be configured such that an interference fit between the first insert part and the second insert part may be engaged by moving a second flange of the second insert part towards a first flange of the first insert part, which may thereby reduce the overall height of the adjustable-height insert to a selected height. Presently disclosed adjustable-height inserts may be configured for flush installation in a sandwich panel. Methods of installing such adjustable-height inserts and adjusting the height of the same are also disclosed.

20 Claims, 8 Drawing Sheets

(51) Int. Cl.
  *B64D 11/00* (2006.01)
  *F16B 5/01* (2006.01)

(56) References Cited

U.S. PATENT DOCUMENTS

| | | | |
|---|---|---|---|
| 3,579,942 | A | 5/1971 | Cole |
| 3,601,278 | A | 8/1971 | Merz et al. |
| 3,621,557 | A | 11/1971 | Cushman et al. |
| 3,678,980 | A | 7/1972 | Gutshall |
| 3,962,843 | A | 6/1976 | King, Jr. |
| 4,266,687 | A | 5/1981 | Cummings |
| 4,423,819 | A | 1/1984 | Cummings |
| 4,509,308 | A | 4/1985 | Dettfurth et al. |
| 4,717,612 | A | 1/1988 | Shackelford |
| 4,981,735 | A | 1/1991 | Rickson |
| 5,093,957 | A | 3/1992 | Do |
| 5,253,967 | A | 10/1993 | Orban et al. |
| 5,620,287 | A | 4/1997 | Pratt |
| 6,641,343 | B1 | 11/2003 | Duran |
| 8,382,415 | B1 | 2/2013 | Goldbaum |
| 8,814,430 | B2 | 8/2014 | Veternik et al. |
| 2004/0265091 | A1 | 12/2004 | Cheung |
| 2005/0103433 | A1 | 5/2005 | Flynn et al. |
| 2017/0036750 | A1 | 2/2017 | Lewis et al. |

FOREIGN PATENT DOCUMENTS

| | | |
|---|---|---|
| GB | 861884 | 3/1961 |
| GB | 1059928 | 2/1967 |
| GB | 2017857 | 10/1979 |
| WO | WO 2009/050239 A1 | 4/2009 |
| WO | WO 2014/088600 A1 | 6/2014 |
| WO | WO 2017/049130 A1 | 3/2017 |

OTHER PUBLICATIONS

Printout of screenshots of Dupo, Threaded Inserts webpage, available at least as early as Apr. 6, 2015. Downloaded from http://dupo.nl/en/categorie/plastic-metal-spare-parts/threaded-inserts/.

Printout of Shur-Lok Products, Fasteners for Sandwich Structure webpage, available at least as early as Jan. 14, 2016. Downloaded from http://www.shur-lok.eu/contents/products/sandwich.html.

"TYE2400 Series Insert: Molded in, Adjustable, Threaded, Self-Locking, Clearance Hole, Sandwich Panel," The Young Engineers, available at least as early as Mar. 31, 1989.

Printout of the Young Engineers, Inc., Composite Fasteners, Non-metallic Fasteners webpage, available at least as early as Jan. 14, 2016. Downloaded from http://www.youngengineers.com/Composites.aspx.

Printout of the Young Engineers, Inc., Floating Nut Fasteners webpage, available at least as early as Jan. 14, 2016. Downloaded from http://www.youngengineers.com/Floaters.aspx.

Printout of the Young Engineers, Inc., Loret Isolator Inserts webpage, available at least as early as Jan. 14, 2016. Downloaded from http://www.youngengineers.com/Isolators.aspx.

Printout of the Young Engineers, Inc., Molded in Threaded Fasteners webpage, available at least as early as Jan. 14, 2016. Downloaded from http://www.youngengineers.com/MoldedInThreaded.aspx.

Printout of MSC Industrial Supply Co., Brass Press Fit Fastener webpage, available at least as early as Jan. 8, 2016. Downloaded from http://www.mscdirect.com/industrialtools/brass-press-fit-fastener.html.

Extended European Search Report, European Patent Office, issued for related European Application No. 17159713 on Jun. 12, 2017.

ADJUSTABLE-HEIGHT INSERTS AND RELATED METHODS

FIELD

The present disclosure relates to adjustable-height inserts and related methods.

BACKGROUND

Sandwich panels (e.g., a core sandwiched between two layers of material, or skins) are often used in the construction of aircraft, because they have high strength-to-weight ratios. Depending on the specific location and application of a sandwich panel in an aircraft, one or more round inserts may be required to be inserted within or through a sandwich panel in order to affix one or more other structures or fasteners to the panel. Round inserts may be used to transfer localized loads (e.g., via a pin, bolt, screw, joint, or other structure) to the sandwich panel, such as to fasten the sandwich panel to another structure, join multiple sandwich panels to each other, and/or attach one or more external objects to the sandwich panel. For example, round inserts may be configured to receive a pin or bolt or other fastener in order to secure another panel or object to the sandwich panel, via the round insert. In the aerospace industry, such sandwich panels and round inserts may be used to assemble the interior main structure and/or secondary structures of the aircraft, and/or may be used to form floor boards, wall panels, galleys, stow bins, overhead compartments, lavatories, and/or other structures within the aircraft. Such sandwich panels and round inserts are also used in other industries.

FIGS. 1 and 2 illustrate a conventional round insert 10 installed in a sandwich panel 11, shown schematically in cross-section. Sandwich panel 11 may include a core 13 sandwiched between a first skin 15 and a second skin 17. First skin 15 and second skin 17 may be rigid or semi-rigid skins, and are typically relatively thin compared to core 13, which is typically formed of a lightweight material. Conventional round insert 10 may be inserted into a circular bore 19 formed in sandwich panel 11, which may be a blind bore 21 (FIG. 1) or a through-bore 23 (FIG. 2). Blind bore 21 may extend through one of the skins (e.g., first skin 15, as shown in FIG. 1) and into the core 13, towards the other skin (e.g., second skin 17), whereas through-bore 23 may extend entirely through first skin 15, second skin 17, and core 13. As shown in FIGS. 1 and 2, a flange portion 27 of conventional round insert 10 may be substantially flush with one of more of first skin 15 and second skin 17, or, as shown in FIG. 3, flange portion 27 of conventional round insert 10 may lay on top of (e.g., on an outer surface of) first skin 15 or second skin 17.

In conventional techniques, an adhesive material, such as a potting compound or epoxy, is injected through potting holes, or vents, in conventional round insert 10 to fill a gap or space 29 between conventional round insert 10 and core 13 of sandwich panel 11. The adhesive material, once fully cured, serves to secure the insert in place within circular bore 19 of sandwich panel 11, and is designed to prevent relative movement of conventional round insert 10 with respect to sandwich panel 11 and retain conventional round insert 10 within circular bore 19 (e.g., resisting pull-out, rotation, and lateral movement of conventional round insert 10) once the adhesive compound dries, solidifies, and/or cures.

However, due to variations in sizes of sandwich panels and bores, dozens of different sizes of conventional inserts are needed. Often, the incorrect size insert may be installed into a given bore, due to selecting the wrong insert, and/or inaccurately determining the needed size. For example, in situations where only one side of the sandwich panel is accessible, measuring the thickness of the sandwich panel to determine the correct insert size may be difficult. Installing the wrong insert may result in significant scrap and/or rework costs. Furthermore, due to the large number of inserts that may need to be installed in a given sandwich panel or apparatus, shortages of particular sizes are common during manufacturing, due to inaccuracies. Prior art solutions have included inserts having an adjustable height, however these prior art inserts include a flange (such as flange portion 27 shown in FIG. 3) that sits on the surface of the sandwich panel, such that the insert is not flush with the panel. While these prior art inserts may address some issues in the field, they are not suitable for applications requiring a flush installation. Such issues with conventional inserts and methods of installing the same within a sandwich panel are on-going and problematic in a variety of industries.

SUMMARY

Presently disclosed adjustable-height inserts and related methods (e.g., methods of installing one or more such inserts in a sandwich panel and adjusting the height of the adjustable-height insert) may address one or more issues with conventional inserts and related methods. For example, one example of an adjustable-height insert according to the present disclosure may include a first insert part and a second insert part. The first insert part may include a first flange having a first upper surface and a first lower surface, a first neck extending from the first upper surface of the first flange, and a first hole extending at least through the first neck and defined at least partially by a first inner surface of the first neck. The first neck also may include a first outer surface opposite the first inner surface. The second insert part may include a second flange having a second upper surface and a second lower surface, a second neck extending from the second lower surface of the second flange, and a second hole extending through the second neck and the second flange, wherein the second hole is partially defined by a second inner surface of the second neck.

The second insert part may be configured to be selectively operatively positioned with respect to the first insert part such that the second inner surface of the second neck engages the first outer surface of the first neck with an interference fit. The adjustable-height insert may be configured to have a selectively adjustable overall height such that moving the second insert part with respect to the first insert part such that the second flange is moved towards the first flange reduces the overall height of the adjustable-height insert. Further, the first hole and the second hole may be at least substantially concentric when the second insert part is operatively positioned with respect to the first insert part. Contrary to prior art inserts, presently disclosed adjustable-height inserts may be configured for flush installations without requiring access to both sides of the sandwich panel.

Such adjustable-height inserts may be configured to be installed in a bore of a sandwich panel according to presently disclosed methods. The sandwich panel may include a first skin, a second skin opposite the first skin, and a core therebetween. Methods of installing an adjustable-height insert into a respective bore of a sandwich panel may include installing the adjustable-height insert such that at least a portion of the first neck and at least a portion of the second neck of the adjustable-height insert are positioned within the respective bore in a core of the sandwich panel, and adjusting the height of the adjustable-height insert until the plurality of radially-extending projections of the adjustable-height insert engage the sandwich panel and/or until the second upper surface of the second flange is at least substantially flush with the sandwich panel. The height of the adjustable-height insert may be adjusted, for example, by moving the second insert part with respect to the first insert part, such that the second flange is moved towards the first flange, thereby engaging an interference fit between the first insert part and the second insert part, and reducing the overall height of the adjustable-height insert.

DESCRIPTION

Figure 1:
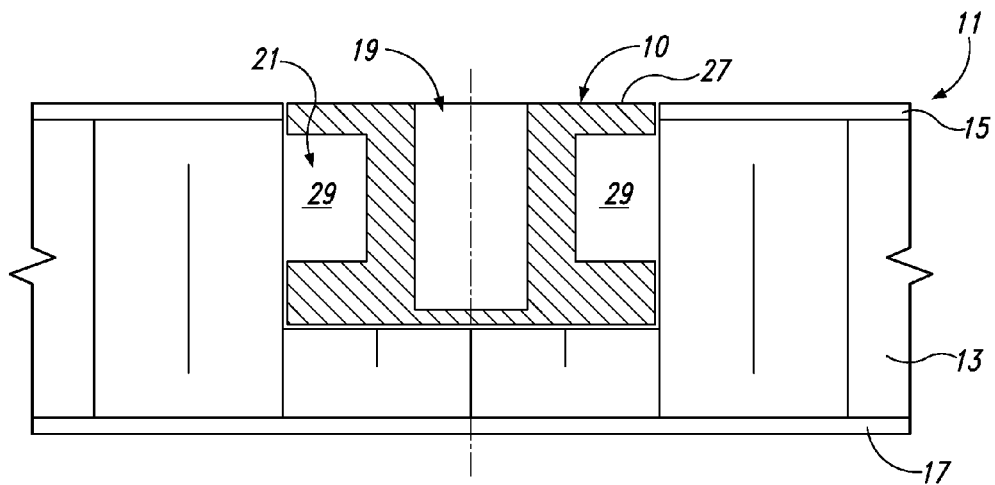
FIG. 1 is a schematic, cross-section view of a prior art insert positioned within a blind bore formed in a sandwich panel, the insert being flush with the sandwich panel skin.
Figure 2:
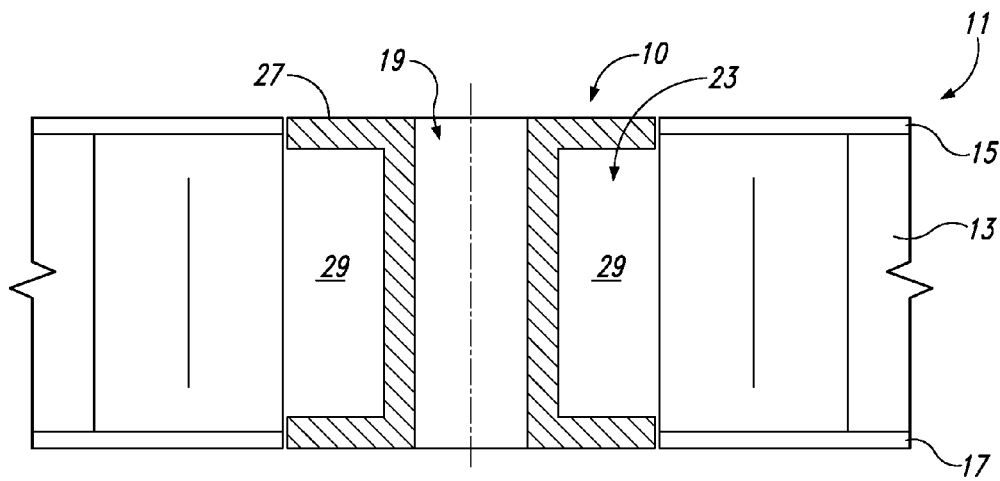
FIG. 2 is a schematic, cross-section view of a prior art insert positioned within a through-bore formed in a sandwich panel, the insert being flush with the sandwich panel skin.
Figure 3:
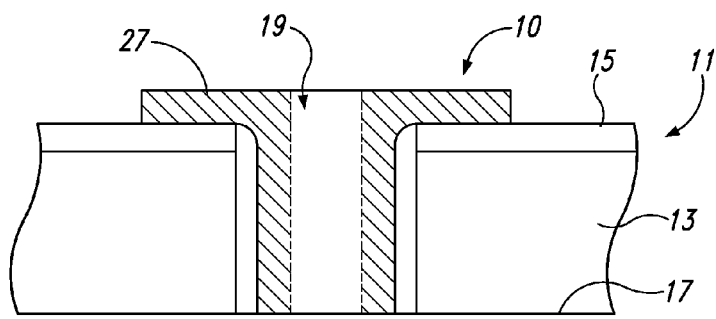
FIG. 3 is a schematic, cross-section view of a prior art insert positioned with respect to a sandwich panel.
Figure 4:
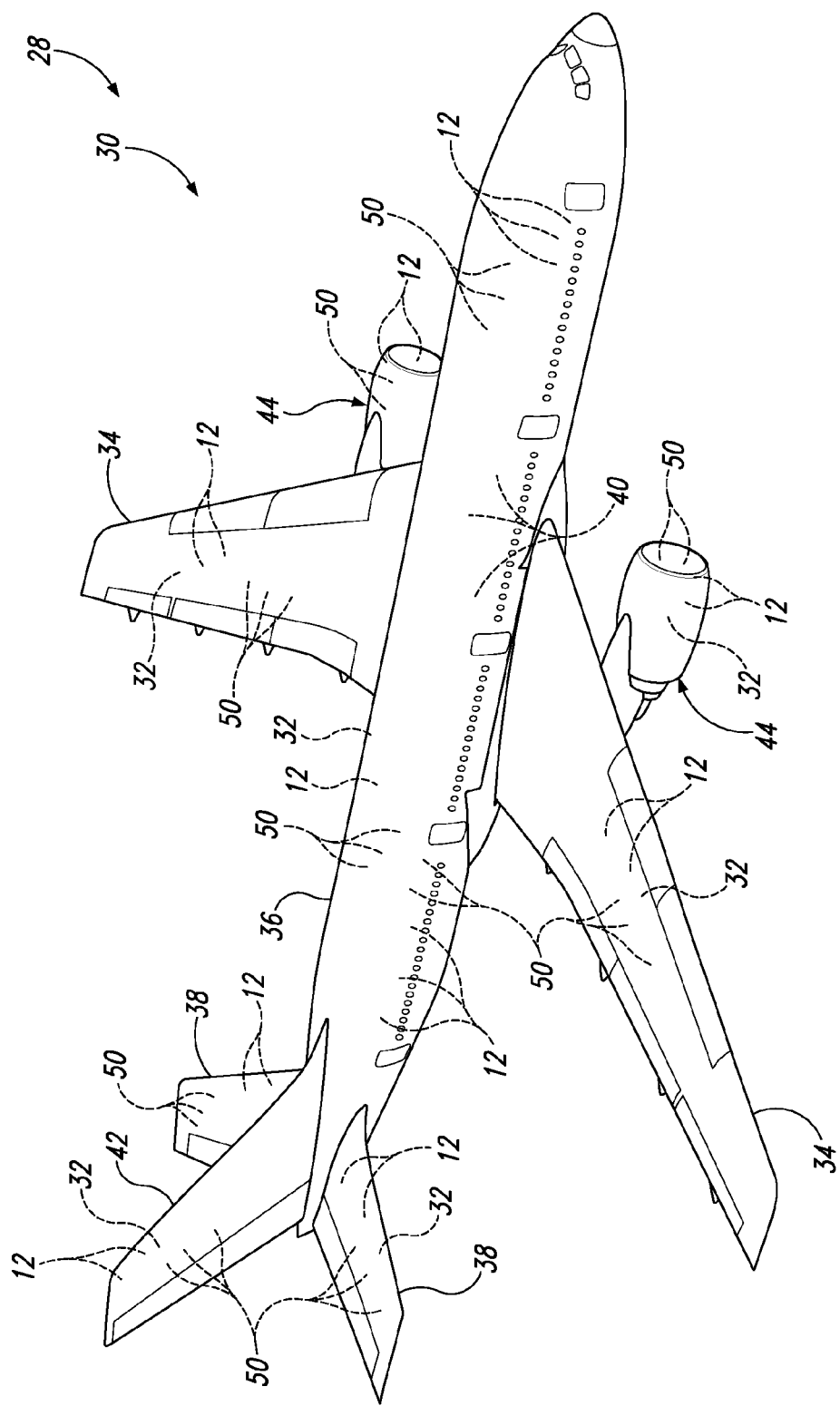
FIG. 4 is a perspective, schematic view of illustrative, non-exclusive examples of an apparatus that may include one or more sandwich panels including one or more inserts according to the present disclosure.

With reference to FIG. 4, one or more adjustable-height inserts 50 according to the present disclosure may be installed in one or more sandwich panels 12 (which may be of similar construction to sandwich panel 11 from FIGS. 1-3). For example, such sandwich panels 12 including one or more adjustable-height inserts 50 may be useful in the aerospace, automotive, electronic, construction, military, recreation, and/or motorsport industries. In FIG. 4, an example of an apparatus 28 that may include one or more sandwich panels 12 and adjustable-height inserts 50 generally is illustrated in the form of an aircraft 30. Aircraft 30 may take any suitable form, including commercial aircraft, military aircraft, or any other suitable aircraft. While FIG. 4 illustrates an aircraft 30 in the form of a fixed wing aircraft, other types and configurations of aircraft are within the scope of aircraft 30 according to the present disclosure, including (but not limited to) rotorcraft and helicopters.

Figure 5:
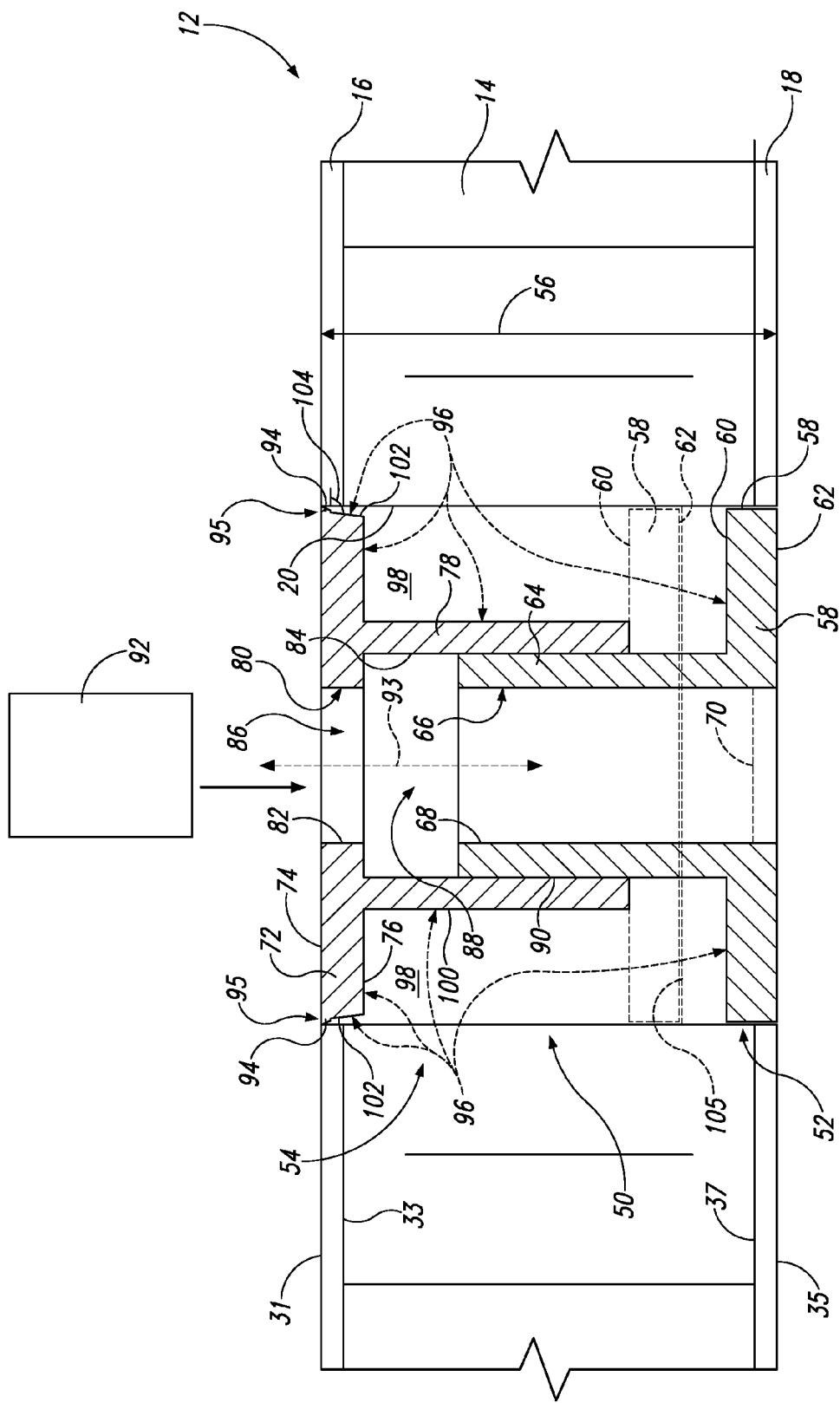
FIG. 5 is a schematic view of illustrative, non-exclusive examples of adjustable-height inserts according to the present disclosure, positioned within a bore of a sandwich panel.

Apparatus 28 (e.g., aircraft 30) may include one or more structures 32 formed from one or more sandwich panels 12, one or more of which may be composite panels. As shown in FIG. 5, each sandwich panel 12 includes a core 14 formed of a relatively lightweight material, such as a plurality of elongate cells, typically having hexagonal or rectangular cross-sections. Such cores 14 may be referred to as honeycomb cores, but other shapes and configurations also may be used, such as a corrugated structure and/or foam materials. Core 14 may include an open-cell structure and/or a closed-cell structure. Core 14 may be formed of foam, aluminum, Nomex® (aramid), carbon, Korex, Kevlar®, fiberglass, polyethersulfone, polyvinylchloride, polyurethane, polyethylene foam, polystyrene foam, balsa wood, syntactic foam, a honeycomb structure, a polymer honeycomb, a thermoplastic honeycomb, stainless steel, polycarbonate, and/or polypropylene.

Sandwich panels 12 include at least two skins, first skin 16 being positioned on one side of core 14 and second skin 18 being positioned on another (opposing) side of core 14, arranged to form a three-layer sandwich structure. First skin 16 includes a first outer panel surface 31 and a first inner panel surface 33 opposite first outer panel surface 31. Second skin 18 includes a second outer panel surface 35 and a second inner panel surface 37 opposite first outer panel surface 35. Core 14 generally extends between first inner panel surface 33 and second inner panel surface 37, while first outer panel surface 31 and second outer panel surface 35 form the outer surfaces of sandwich panel 12. The panel skins (e.g., first skin 16 and second skin 18) are typically rigid, with core 14 spanning between the skins. First skin 16 and second skin 18 may be formed of a laminate of fiberglass-reinforced polymer, a laminate of carbon fiber-reinforced polymer, a thermoset polymer, an epoxy, sheet metal, carbon, aramid, aluminum, steel, plywood, balsa, teak, and/or hardwood. First skin 16 and second skin 18 may be formed of the same material(s) in some examples, or may be formed of different materials in other examples.

Again with reference to FIG. 4, structures 32 may include one or more sandwich panels 12, joints formed between two or more sandwich panels 12, and/or three-dimensional structures formed using one or more sandwich panels 12. As illustrative, non-exclusive examples, structures 32 may be utilized in such aircraft structures as wings 34, fuselages 36, horizontal stabilizers 38, overhead storage bins 40, vertical stabilizers 42, and engine housings 44; however, other components of aircraft 30 additionally or alternatively may include structures 32 such as sandwich panels 12 and/or joints formed between two or more sandwich panels 12. Other applications in aircraft 30 for sandwich panels 12 including one or more adjustable-height inserts 50 according to the present disclosure include floor panels, interior walls, food handling galley assemblies, wing control surfaces, passenger storage racks, thrust deflector assemblies, capsule panels, ablative shields for nose cones, instrumentation enclosures and shelves, and bulkhead panels. In other industries, examples of apparatus 28 (including one or more sandwich panels 12 and adjustable-height inserts 50) may include or be a portion of space satellites, electronic radome construction, transit vehicles, shipping containers, shelters, large antennae or disk reflectors, refrigeration panels, rapid transit floor panels, shipboard electronic deck shelters, cargo pallets, automobile bodies, architectural curtain walls, partitions, divider panels, expandable hospital shelters, and/or interior structures of an assembly.

Turning now to FIG. 5, examples of adjustable-height inserts 50 are schematically represented, shown having been installed within a bore 20 of sandwich panel 12. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Generally, adjustable-height insert 50 may be a two part insert, having a first insert part 52 and a second insert part 54. Second insert part 54 may be configured to be selectively operatively positioned with respect to first insert part 52 and installed within bore 20 of sandwich panel 12. An overall height 56 of adjustable-height insert 50 may be selectively adjusted, such as by moving second insert part 54 with respect to first insert part 52, as will be explained in more detail below. In this manner, the height 56 of adjustable-height insert 50 may be selectively adjusted so that adjustable-height insert 50 may be installed such that it is at least substantially flush with an outer surface of sandwich panel 12 (e.g., first outer panel surface 31 or second outer panel surface 35).

First insert part 52 may include a first flange 58 having a first upper surface 60 and a first lower surface 62, a first neck 64 extending from first upper surface 60 of first flange 58, and a first hole 66 extending at least through first neck 64. First hole 66 may be at least partially defined by a first inner surface 68 of first neck 64. In some examples, first hole 66 may extend all the way through first insert part 52, extending through first flange 58 in addition to first neck 64. In some examples, as indicated by dashed line 70, first hole 66 may extend only partially through first neck 64 or only partially through first flange 58.

Second insert part 54 may include a second flange 72 having a second upper surface 74 and a second lower surface 76, a second neck 78 extending from second lower surface 76 of second flange 72, and a second hole 80 extending through second neck 78 and second flange 72. Second hole 80 may be at least partially defined by a second inner surface 84 of second neck 78 and a third inner surface 82 of second flange 72. As shown in FIG. 5, second hole 80 may have a smaller diameter at a first portion 86 extending through second flange 72, and a larger diameter at a second portion 88 extending through second neck 78. First portion 86 of second hole 80 may have substantially the same dimensions as first hole 66, whereas second portion 88 of second hole 80 may have an inner diameter that is approximately equal to or slightly smaller than the outer diameter of first neck 64. Thus, second insert part 54 may be configured to be selectively operatively positioned with respect to first insert part 52 such that second inner surface 84 of second neck 78 engages a first outer surface 90 of first neck 64. For example, adjustable-height insert 50 may be configured such that there is an interference fit between second inner surface 84 of second neck 78 and first outer surface 90 of first neck 64. In this configuration (e.g., when second insert part 54 is operatively positioned with respect to first insert part 52), adjustable-height insert 50 may be configured such that first hole 66 and second hole 80 are at least substantially concentric. In this manner, a secondary object 92, such as a bolt or other fastener, may be inserted through adjustable-height insert 50 (e.g., through second hole 80 and into or through first hole 66). Such secondary objects 92 may be useful for securing hardware or other structures to sandwich panel 12, transferring loads to sandwich panel 12, and/or securing items to sandwich panel 12.

Overall height 56 of adjustable-height insert 50 (defined as the perpendicular distance between second upper surface 74 of second flange 72 and first lower surface 62 of first flange 58) may be selectively adjustable by moving second insert part 54 with respect to first insert part 52. For example, moving second insert part 54 such that second flange 72 is moved towards first flange 58 reduces overall height 56 of adjustable-height insert 50. For example, second insert part 54 may be moved in a substantially longitudinal direction (e.g., in the directions indicated by arrow 93) with respect to first insert part 52, in order to adjust overall height 56 of adjustable-height insert 50.

Adjustable-height insert 50 may include a plurality of radially-extending projections 94 extending from second flange 72, such as adjacent second upper surface 74 of second flange 72. For example, radially-extending projections 94 may be spaced apart about a peripheral edge region 95 of second flange 72 (e.g., radially-extending projections 94 may be spaced apart, about the circumference of second flange 72, adjacent second upper surface 74, in some examples). Adjustable-height inserts 50 may include any suitable number of radially-extending projections 94, such as at least one, at least two, at least three, at least four, at least five, at least six, at least seven, at least eight, at least nine, at least 10, at least 12, at least 15, at least 20, and/or at least 25 radially-extending projections 94. Radially-extending projections 94 may be localized extensions that radially extend farther from second hole 80 than the rest of second flange 72. Radially-extending projections 94 may be formed integrally with second flange 72, or may be secured or coupled to second flange 72. In some examples, radially-extending projections 94 may be formed of the same material as second flange 72. In other examples, radially-extending projections 94 may be formed of a different material than second flange 72.

Adjustable-height insert 50 may be configured such that second upper surface 74 of second flange 72 is at least substantially flush with either first skin 16 or second skin 18 of sandwich panel 12, when second insert part 54 is operatively positioned with respect to first insert part 52 and adjustable-height insert 50 is installed in bore 20 of sandwich panel 12. As used herein, a surface is "substantially flush" with another surface when the two surfaces are at least substantially level or in alignment with each other. For example, a flush installation of adjustable-height insert 50 would be an installation where second upper surface 74 of second flange 72 (e.g., the outer surface of second flange 72) is at least substantially flush with the outer surface of a skin of sandwich panel 12 when the insert is installed in the sandwich panel. For example, as shown in FIG. 5, adjustable-height insert 50 is configured such that second upper surface 74 of second flange 72 is substantially flush with first skin 16 when adjustable-height insert 50 is installed within bore 20 because second upper surface 74 of second flange 72 is substantially level with first outer panel surface 31 of first skin 16.

To facilitate this at least substantially flush installation, radially-extending projections 94 may be configured to engage with sandwich panel 12 (e.g., with first skin 16 or second skin 18, depending on the orientation of adjustable-height insert 50 with respect to sandwich panel 12) when second insert part 54 is operatively positioned with respect to first insert part 52 and adjustable-height insert 50 is installed in bore 20 of sandwich panel 12. For example, radially-extending projections 94 may be configured to prevent or resist second insert part 54 from being positioned sub-flush with respect to sandwich panel 12 (e.g., further inserted into bore 20 beyond a flush installation), as the height of adjustable-height insert 50 is adjusted. In other words, as second insert part 54 is moved with respect to first insert part 52 such that second flange 72 is moved towards first flange 58, radially-extending projections 94 may be pressed into and engaged with first skin 16 or second skin 18, to at least substantially prevent further reduction of the height of adjustable-height insert 50 once second upper surface 74 is at least substantially flush with the respective skin of sandwich panel 12. In addition to radially-extending projections 94, an interference fit between first neck 64 and second neck 78 may be configured to maintain adjustable-height insert 50 at the appropriate height to which it is adjusted (e.g., retaining adjustable-height insert 50 such that second upper surface 74 of second flange 72 is at least substantially flush with first skin 16 or second skin 18 of sandwich panel 12).

In some examples, each of the radially-extending projections 94 may extend from a circumferential surface 102 of second flange 72 at a non-parallel angle 104, which may be obtuse in some examples. In some examples, second flange 72 may be tapered such that its diameter adjacent second upper surface 74 is greater than its diameter adjacent second lower surface 76, or vice versa. In other words, circumferential surface 102 of second flange 72 may be non-parallel to bore 20. Similarly, first flange 58 may be tapered such that a circumferential surface 103 of first flange 58 is non-parallel to bore 20 and its diameter adjacent first lower surface 62 may be greater than its diameter adjacent first upper surface 60, or vice versa. The diameter of second flange 72 adjacent second upper surface 74 may be approximately equal to the diameter of bore 20 in some examples. The diameter of second flange 72 adjacent second upper surface 74 may be slightly less than the diameter of bore 20 in some examples. In this manner, second upper surface 74 may be positioned such that it is at least substantially flush with sandwich panel 12 (e.g., first skin 16 of sandwich panel 12), as opposed to resting on the outer surface of sandwich panel 12 (e.g., first outer panel surface 31 of first skin 16). In this position, radially-extending projections 94 may press into and/or slightly compress sandwich panel 12 (e.g., first skin 16 of sandwich panel 12) in locations in the proximity of the radially-extending projections 94.

In some examples, adjustable-height insert 50 may include one or more anti-rotation features 96 that are configured to resist rotation of adjustable-height insert 50 with respect to sandwich panel 12 once adjustable-height insert 50 is fully inserted into sandwich panel 12. For example, anti-rotation feature 96 may include a textured surface that may engage with a potting compound or other adhesive injected into a space 98 within bore 20, space 98 being defined between bore 20 and adjustable-height insert 50. For example, anti-rotation feature 96 may include a textured surface of a second outer surface 100 of second neck 78 (e.g., second outer surface 100 of second neck 78 may be textured and/or have a textured coating deposited thereon or adhered thereto, which may function as anti-rotation feature 96). Some or all of second outer surface 100 of second neck 78 may be textured. In some examples, anti-rotation feature 96 may include textured surfaces on other portions of adjustable-height insert 50, such as on first flange 58, first neck 64, and/or second flange 72. Anti-rotation feature 96 may include any structure or component of adjustable-height insert 50 that is configured to resist rotation of adjustable-height insert 50 with respect to sandwich panel 12, once adjustable-height insert 50 is installed in bore 20.

In use, adjustable-height insert 50 may be configured such that the overall height 56 of the insert is selectively adjustable once first insert part 52 and second insert part 54 are at least partially inserted into bore 20 of sandwich panel 12. For example, in the case of a blind bore, first insert part 52 may be placed into bore 20 of sandwich panel 12 and positioned within bore 20 such that first flange 58 is positioned adjacent a base 105 of bore 20 (as shown in dashed line), such that first neck 64 extends away from base 105 and into bore 20 from within the bore. In the case of a through bore, first insert part 52 may be placed into bore 20 of sandwich panel 12 and positioned within bore 20 such that first flange 58 is positioned adjacent one of the panel skins (e.g., adjacent second skin 18) and such that first neck 64 extends away from the skin and into bore 20, towards the other panel skin (e.g., first neck 64 may extend away from second skin 18 and into bore 20, towards first skin 16, or vice versa). In these examples, first lower surface 62 of first flange 58 may be substantially flush with one side of sandwich panel 12, such as substantially flush with second outer panel surface 35 of second skin 18, as shown in FIG. 5.

Second insert part 54 may be operatively positioned with respect to first insert part 52. Such operative positioning of second insert part 54 with respect to first insert part 52 may be performed before or after first insert part 52 is positioned within bore 20. In some examples, second insert part 54 may be operatively positioned with respect to first insert part 52 such that second neck 78 is placed around first neck 64 (e.g., second inner surface 84 of second neck 78 may be positioned adjacent and engaged with first outer surface 90 of first neck 64). As shown in FIG. 5, second insert part 54 may be oriented such that second neck 78 is positioned between first flange 58 of first insert part 52 and second flange 72 of second insert part 54, and such that second neck 78 extends into bore 20, (e.g., towards base 105 of bore 20, and/or towards second skin 18, as shown in FIG. 5).

To adjust the height 56 of adjustable-height insert 50, second insert part 54 may be moved with respect to first insert part 52. For example, second insert part 54 may be slid downward such that second neck 78 travels longitudinally along and with respect to first neck 64 (e.g., a force may be applied to second insert part 54), such that second flange 72 is moved towards first flange 58 and the height of adjustable-height insert 50 is reduced. Thus, adjustable-height insert 50 may be adjustable without requiring access to both sides of the insert (e.g., height 56 of adjustable-height insert 50 may be adjustable from just one side of sandwich panel 12, such as adjacent first skin 16 and second flange 72, without requiring access to second skin 18 or first flange 58). This may be advantageous in applications where only one side of sandwich panel 12 is accessible, and/or when the correct insert size is difficult to ascertain.

Height 56 of adjustable-height insert 50 may be adjustable between a maximum height and a minimum height. The difference between such maximum and minimum heights may be at least 0.05 inches (in) (1.27 millimeters (mm)), at least 0.10 in (2.54 mm), at least 0.15 in (3.81 mm), at least 0.20 in (5.08 mm), at least 0.30 in (7.62 mm), at least 0.40 in (10.16 mm), at least 0.5 in (12.7 mm), at least 0.6 in (15.24 mm), at least 0.7 in (17.78 mm), at least 0.8 in (20.32 mm), at least 0.9 in (22.86 mm), and/or at least 1.0 in (25.4 mm). In some examples, the difference between the minimum height and the maximum height is at least 10% of the maximum height, at least 15% of the maximum height, at least 20% of the maximum height, at least 25% of the maximum height, at least 30% of the maximum height, at least 35% of the maximum height, at least 40% of the maximum height, at least 45% of the maximum height, and/or at least 50% of the maximum height.

First insert part 52 and second insert part 54 may be made of any suitable material. In some examples, first insert part 52 and/or second insert part 54 may be polymeric. In some examples, first insert part 52 and/or second insert part 54 may be metallic. Advantageously, some examples of adjustable-height inserts 50 may be configured to be installed in a sandwich panel 12 and adjusted for a flush installation, without requiring the use of tools.

Sandwich panel 12 may include a plurality of bores 20 spaced apart from each other. In some examples, at least one bore 20 may be formed through first skin 16 and at least a portion of core 14. Additionally or alternatively, at least one bore 20 may be formed through second skin 18 and at least a portion of core 14. In some examples, at least one bore 20 may be a blind bore, such that the bore does not extend all the way through sandwich panel 12 (e.g., bore 20 may be formed through first skin 16 and extend towards second skin 18, through a portion of core 14). Additionally or alternatively at least one bore 20 may be a through bore, extending through both first skin 16, second skin 18, and all the way through core 14. In some examples, a given sandwich panel 12 may include a plurality of bores 20 of different sizes and/or depths. Thus, a plurality of adjustable-height inserts 50 may be provided, such that a different respective adjustable-height insert 50 may be installed in each respective bore 20. Due to the adjustable nature of adjustable-height inserts 50, the same size adjustable-height insert 50 may be usable in a plurality of different bore sizes and adjusted according to the height of the respective bore 20 in which the respective adjustable-height insert 50 is placed. In some examples, a system may include a plurality of sizes of adjustable-height inserts 50, where a relatively small number of sizes of adjustable-height inserts 50 may replace a much larger number of sizes of conventional inserts.

One or more bores 20 may be at least substantially cylindrical in some examples (e.g., one or more bores 20 may have a substantially circular cross-sectional area). Additionally or alternatively, one or more bores 20 may have other cross-sectional areas, such as oval, elliptical, rectangular, triangular, polygonal, and/or irregularly shaped cross-sectional areas. An adhesive, such as potting compound, quick-cure compound, and/or UV-cure compound may be inserted (e.g., injected) between core 14 and adjustable-height insert 50 (e.g., between core 14 and anti-rotation feature 96 of adjustable-height insert 50), once adjustable-height insert 50 is positioned within bore 20. For example, a potting compound may be injected through one or more vents 106 (seen in FIG. 11), such that potting compound is inserted into space 98, adjacent second neck 78 of second insert part 54. Such potting compound may cure, thereby further securing adjustable-height insert 50 in place within bore 20.

Turning now to FIGS. 6-12, illustrative non-exclusive examples of adjustable-height inserts and components or portions thereof are illustrated. Where appropriate, the reference numerals from the schematic illustrations of FIG. 5 are used to designate corresponding parts of the examples of FIGS. 6-12; however, the examples of FIGS. 6-12 are non-exclusive and do not limit adjustable-height inserts to the illustrated embodiments of FIGS. 6-12. That is, adjustable-height inserts 50 are not limited to the specific embodiments of FIGS. 6-12, and may incorporate any number of the various aspects, configurations, characteristics, properties, etc. of adjustable-height inserts that are illustrated in and discussed with reference to the schematic representations of FIG. 5 and/or the embodiments of FIGS. 6-12, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 6-12; however, it is within the scope of the present disclosure that the previously discussed features, variants, etc. may be utilized with the examples of FIGS. 6-12.

Figure 6:
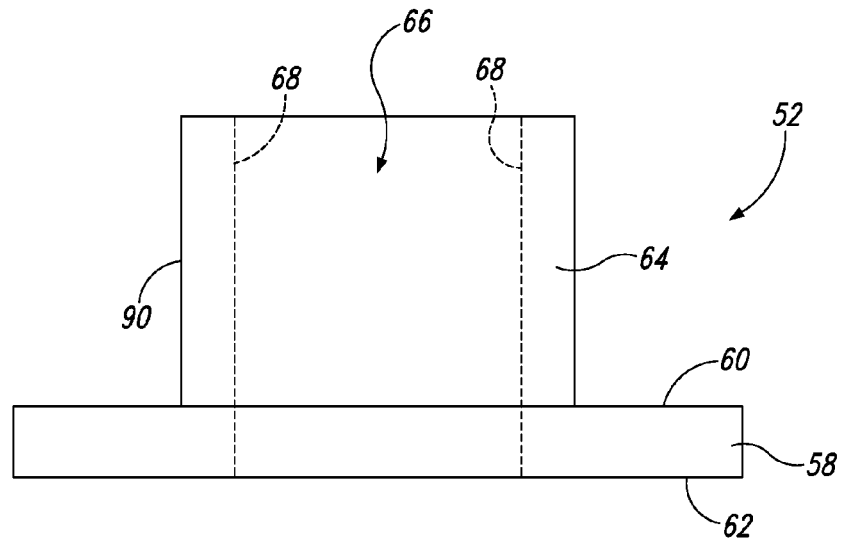
FIG. 6 is an elevation view of a first insert part of an adjustable-height insert according to the present disclosure.
Figure 7:
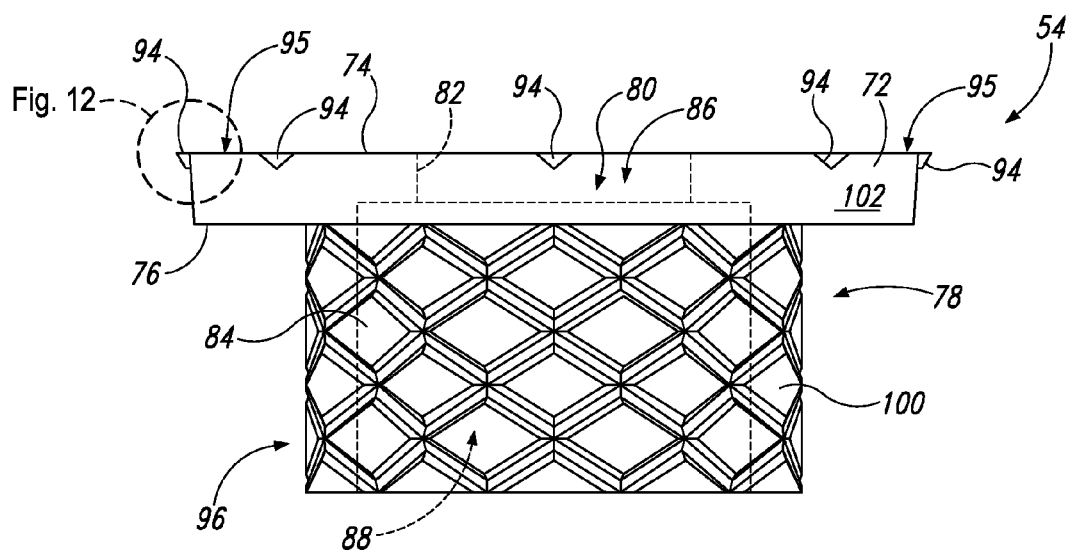
FIG. 7 is an elevation view of a second insert part of an adjustable-height insert according to the present disclosure.

FIGS. 6-12 illustrate an adjustable-height insert 51 (or portions or components thereof), which is an example of adjustable-height insert 50 of FIG. 5. FIG. 6 illustrates one example of first insert part 52, having first hole 66 extending through first neck 64 and first flange 58. FIG. 7 illustrates one example of second insert part 54, having second hole 80 extending through second flange 72 and second neck 78. Second outer surface 100 of second neck 78 is shown as textured, which may serve as anti-rotation feature 96, once second insert part 54 is operatively positioned with respect to first insert part 52 and installed within a bore in a sandwich panel (e.g., bore 20 of sandwich panel 12 of FIG. 5).

Figure 8:
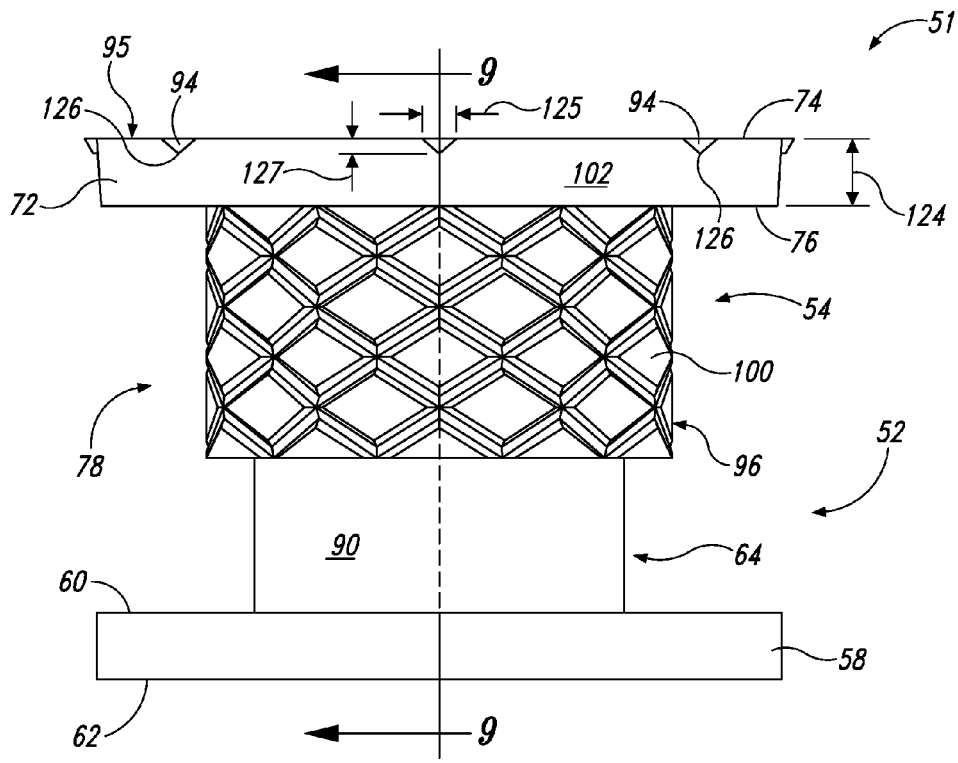
FIG. 8 is an elevation view of the second insert part of FIG. 7 operatively positioned with respect to the first insert part of FIG. 6
Figure 9:
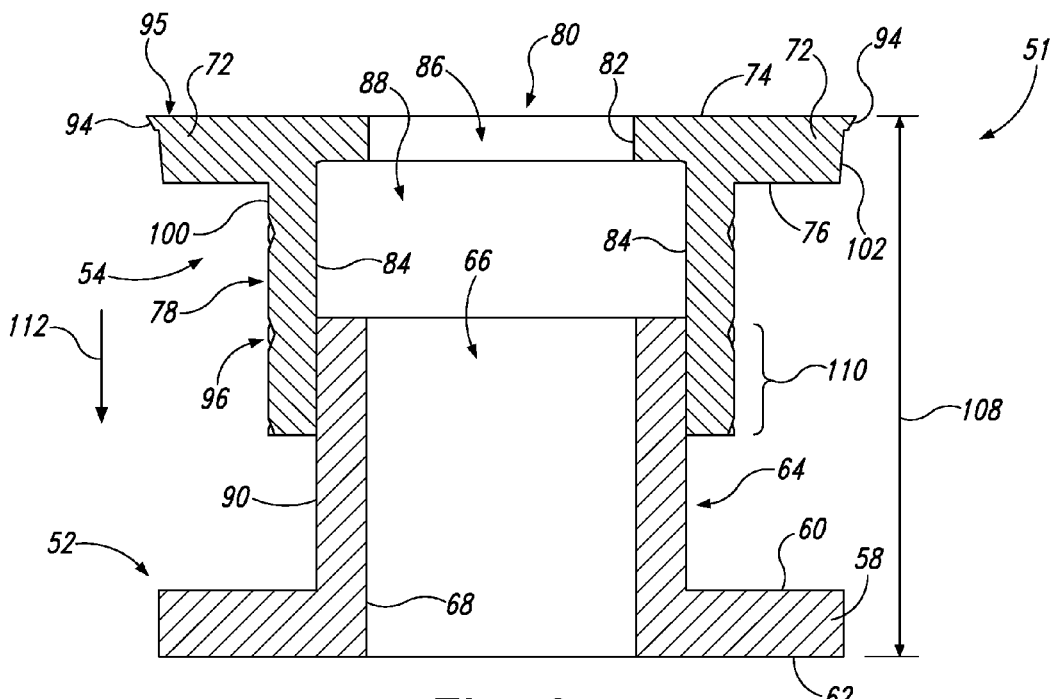
FIG. 9 is a cross-section view of the adjustable-height insert of FIG. 8, taken along line 9-9, and having a maximum overall length.

FIG. 8 shows second insert part 54 of FIG. 7 operatively positioned with respect to first insert part 52 of FIG. 6, and FIG. 9 shows a cross-section of adjustable-height insert 51 of FIG. 8, taken along line 9-9 in FIG. 8. As shown in FIGS. 8-9, second insert part 54 may be operatively positioned with respect to first insert part 52 such that second inner surface 84 of second neck 78 is slidably engaged with first outer surface 90 of first neck 64 of first insert part 52. As arranged, first hole 66 and second hole 80 may be at least substantially concentric, so as to receive a secondary object (e.g., secondary object 92 of FIG. 5) therethrough. FIGS. 8-9 illustrate adjustable-height insert 51 in a configuration having its maximum operative assembly height 108, which may be measured as the perpendicular distance between second upper surface 74 of second insert part 54 and first lower surface 62 of first insert part 52, when adjustable-height insert 51 is assembled (e.g., when second insert part 54 is operatively positioned with respect to first insert part 52, as shown). An overlap region 110, representing the length over which second inner surface 84 of second neck 78 overlaps first outer surface 90 of first neck 64, may have a desired minimum length, depending on the application and/or size of adjustable insert 51.

Figure 10:
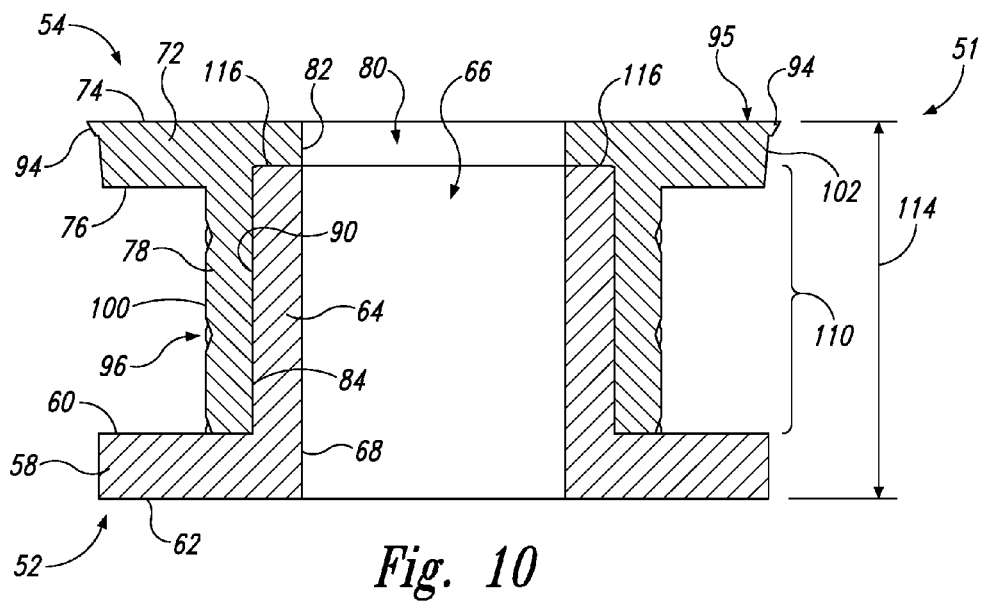
FIG. 10 is a cross-section view of the adjustable-height insert of FIG. 9, having a minimum overall height.

The height of adjustable-height insert 51 may be adjusted, such as by moving second insert part 54 with respect to first insert part 52. For example, second insert part 54 may be moved such that second flange 72 is moved towards first flange 58, thereby reducing the height of adjustable-height insert 51. In some examples a force may be applied to second insert part 54, such as in the direction indicated by arrow 112, thereby moving second flange 72 of second insert part 54 towards first flange 58 of first insert part 52. FIG. 10 shows adjustable-height insert 51 in a configuration having its minimum operative assembly height 114 which may be measured as the perpendicular distance between second upper surface 74 of second insert part 54 and first lower surface 62 of first insert part 52, when adjustable-height insert 51 is assembled and the overall height of adjustable-height insert 51 has been reduced as much as possible (e.g., second insert part 54 has been moved toward first insert part 52, along arrow 112 of FIG. 9). Adjustable-height insert 51 may be selectively adjustable to any height between maximum operative assembly height 108 of FIG. 9, and minimum operative assembly height 114 of FIG. 10, inclusive. As shown in FIG. 10, overlap portion 110 is longer than overlap portion 110 in FIG. 9, due to a greater length of overlap between first outer surface 90 and second inner surface 84 in the configuration having the reduced overall height, as shown in FIG. 10. In some examples, and as shown in FIG. 10, a first upper neck surface 116 of first neck 64 may engage with, be in contact with, and/or be positioned adjacent to second flange 72, in such a minimum operative assembly height configuration. But in some embodiments, there may be a gap between first upper neck surface 116 and second flange 72, even in the minimum operative assembly height configuration.

Figure 11:
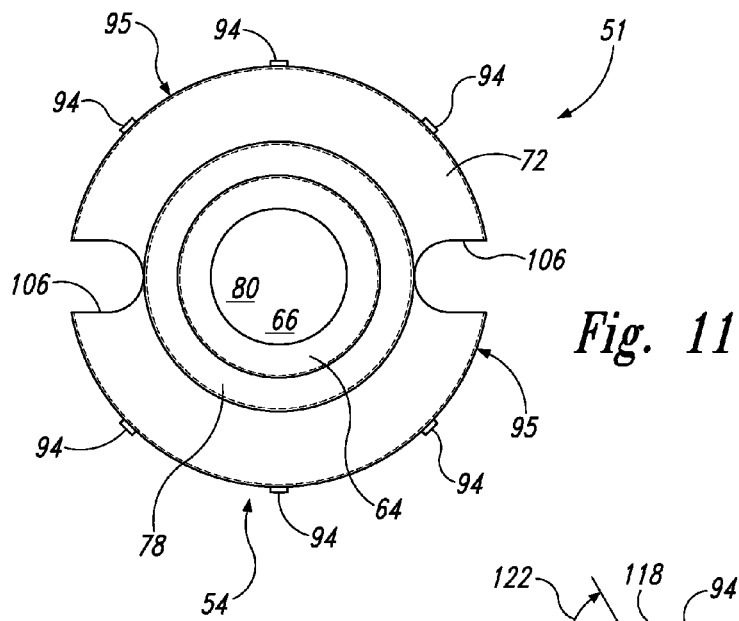
FIG. 11 is a plan view of a second insert part of an adjustable-height insert according to the present disclosure.

FIG. 11 illustrates a top plan view of adjustable-height insert 51 of FIGS. 8-10, which more clearly indicates an example of spacing of radially-extending projections 94, positioned about peripheral edge region 95 of second flange 72. While the example of FIG. 11 illustrates an example having six radially-extending projections 94, more or fewer radially-extending projections 94 are possible. As shown in FIG. 11, radially-extending projections 94 may be generally equally spaced apart along peripheral edge region 95 of second flange 72, but this arrangement is not necessary. Radially-extending projections 94 may be grouped or clumped together in clusters in some examples, and/or may be unequally spaced apart from each other. FIG. 11 also illustrates two vents 106, which may provide access for potting compound (or another adhesive) to be injected once adjustable-height insert 51 is positioned within a bore of a sandwich panel (e.g., potting compound may be inserted into space 98 between bore 20 and the adjustable-height insert, as shown in FIG. 5).

Figure 12:
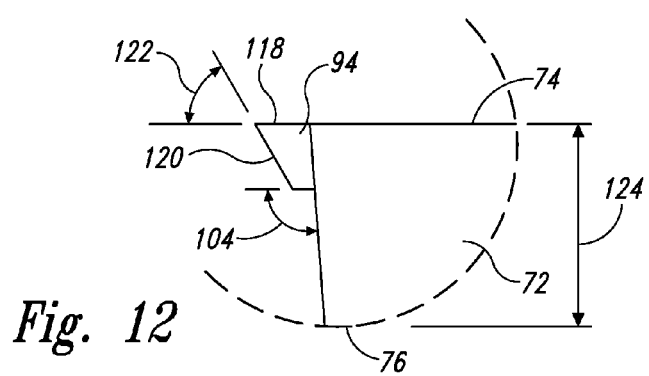
FIG. 12 is a detail view of a portion of the second insert part of FIG. 7.

FIG. 12 shows a close-up of a portion of second flange 72 of second insert part 54, as indicated in FIG. 7, showing one radially-extending projection 94 in more detail. Each radially extending projection 94 may have a top projecting surface 118 and an angled surface 120. Top projecting surface 118 may be at least substantially parallel to second upper surface 74 of second flange 72, and angled surface 120 may form a projection angle 122 with top projecting surface 118. In some examples, projection angle 122 may be an acute angle. In some examples, projection angle 122 may be a right angle, or an obtuse angle. As shown in FIG. 12, top projecting surface 118 may be continuous with second upper surface 74 of second flange 72 in some examples. While FIG. 12 shows one specific example of radially-extending projection 94, many other shapes and configurations are possible, and radially-extending projections 94 according to the present disclosure are not limited to the specific example shown in FIG. 12. Radially-extending projections 94 may take any size or shape as may be configured to engage a sandwich panel and substantially prevent the insert from being installed sub-flush in the sandwich panel.

As shown in FIG. 12, radially-extending projections 94 may extend only along a portion of a height 124 of second flange 72. For example, radially-extending projections 94 may be positioned adjacent second upper surface 74 of second flange 72, but not present adjacent second lower surface 76 of second flange 72. In some examples, radially-extending projections 94 may be barbed or hooked. In some examples, radially-extending projections 94 may be textured. In some examples, and as best seen in FIG. 8, radially-extending projections 94 may be wider adjacent second upper surface 74 of second flange 72, and narrow as they extend towards second lower surface 76 of second flange 72. In some examples, and as shown in FIG. 8, each respective radially-extending projection may converge at a respective point 126 located on circumferential surface 102 of second flange 72. For example, at least some radially-extending projections 94 may be substantially triangular in some examples. In some examples, as shown in FIGS. 8-10 and 12, radially-extending projections 94 may extend along less than half the height 124 of second flange 72. Radially-extending projections 94 may be non-parallel to the longitudinal axis of second flange 72. In some examples, radially-extending projections 94 may have a maximum width 125 (e.g., their dimension adjacent peripheral edge region 95) that is greater than a height 127 of the radially-extending projection, as shown in FIG. 8.

Figure 13:
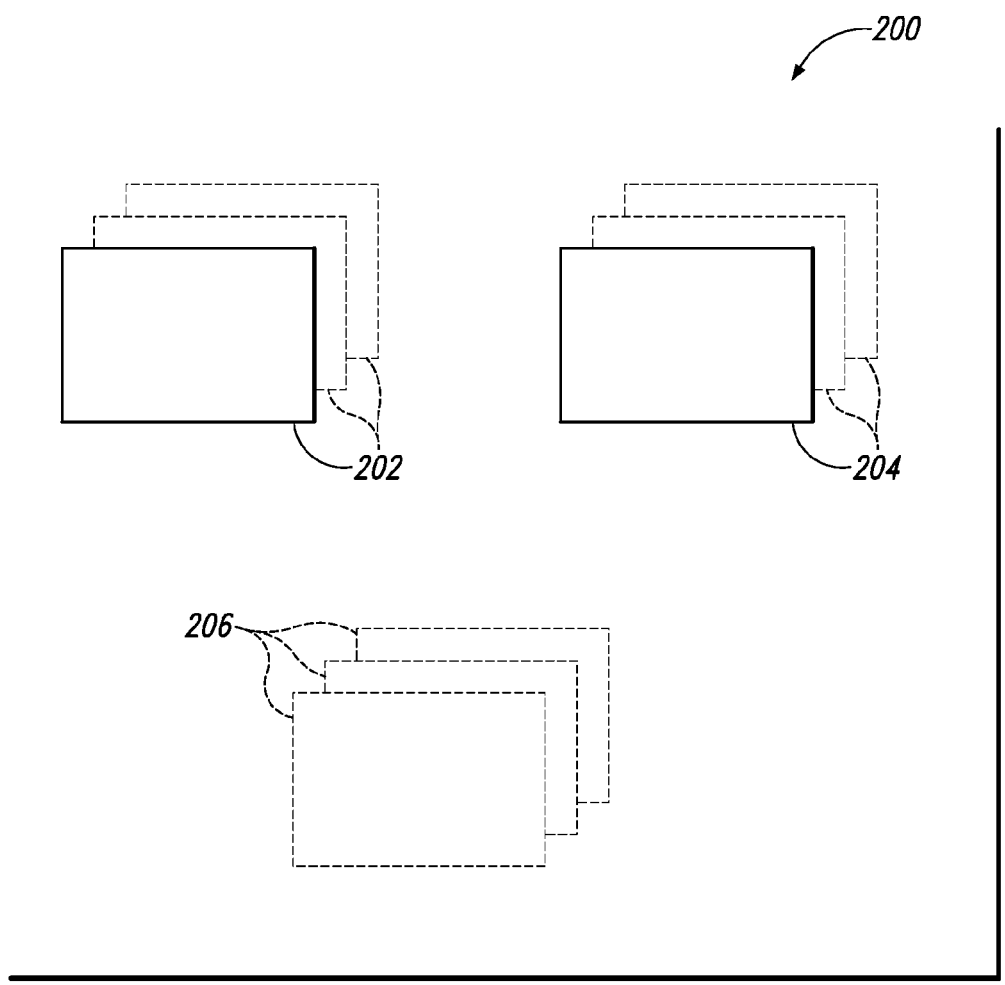
FIG. 13 a schematic view of illustrative, non-exclusive examples of systems of adjustable-height inserts according to the present disclosure.

FIG. 13 illustrates a schematic view of systems 200 of a plurality of adjustable-height inserts according to the present disclosure. For example, systems 200 may include one or more first adjustable-height inserts 202 (which are an example of adjustable-height insert 50), and one or more second adjustable-height inserts 204 (which are an example of adjustable-height insert 50). Each first adjustable-height insert 202 may be adjustable between a first maximum overall height and a first minimum overall height, when the respective second insert part is operatively positioned with respect to the respective first insert part of first adjustable-height insert 202. Similarly, each second adjustable-height insert 204 may be adjustable between a second maximum overall height and a second minimum overall height when the respective second insert part is operatively positioned with respect to the respective first insert part of the second adjustable-height insert 204.

The first minimum overall height and the second minimum overall height may be different from each other. For example, second adjustable-height insert 204 may be a "bigger" size than first adjustable-height insert 202 within system 200, such that the second minimum overall height may be greater than the first minimum overall height. In some examples, there may be some overlap between respective sizes of inserts, such that, for example, the second minimum overall height may be a height in between the first minimum overall height and the first maximum overall height. Similarly, the second maximum overall height may be greater than the first maximum overall height, such that a respective second adjustable-height insert 204 may be adjustable to have a flush installation with a deeper bore than a respective first adjustable-height insert 202. In some systems 200, different sizes of adjustable-height inserts may additionally or alternatively have different flange diameters, such that they may be configured for use with different diameter bores.

Each respective size of inserts within a given system 200 may have an adjustment range, defined as the difference between the minimum overall height and maximum overall height of the adjustable-height insert. For example, first adjustable-height inserts 202 may have a first adjustment range equal to the difference between the first maximum overall height and the first minimum overall height. Similarly, second adjustable-height inserts 204 may have a second adjustment range equal to the difference between the second maximum overall height and the second minimum overall height. In some examples, the second adjustment range may be greater than the first adjustment range.

Systems 200 may include one or more third adjustable inserts 206 (which are an example of adjustable-height insert 50), having a third minimum overall height and a third maximum overall height when the respective second insert part is operatively positioned with respect to the respective first inserts part of third adjustable-height insert 206. The third minimum overall height may be different from the first minimum overall height of first adjustable-height inserts 202 and/or different from the second minimum overall height of second adjustable-height inserts 204. Additionally or alternatively, the third maximum overall height may be different from the first maximum overall height of first adjustable-height inserts 202 and/or different from the second maximum overall height of second adjustable-height inserts 204. In some examples, the third minimum overall height may be greater than the first minimum overall height, greater than the second minimum overall height, and/or less than the second maximum overall height. Additionally or alternatively, the third maximum overall height may be greater than the second maximum overall height and the first maximum overall height.

Systems 200 may include any number of inserts and any number of sizes of inserts. Generally, however, systems 200 may include a smaller number of sizes of adjustable-height inserts than would be required using conventional inserts for the same collection of respective bores. For example, if a given sandwich panel includes bores of 10 different sizes requiring 10 different sizes of conventional inserts, presently disclosed adjustable-height inserts may be suitable for those ten different bores using just one or two sizes of adjustable-height inserts according to the present disclosure. This ratio of the number of required sizes is provided for example purposes only, and is not limiting in any way.

Figure 14:
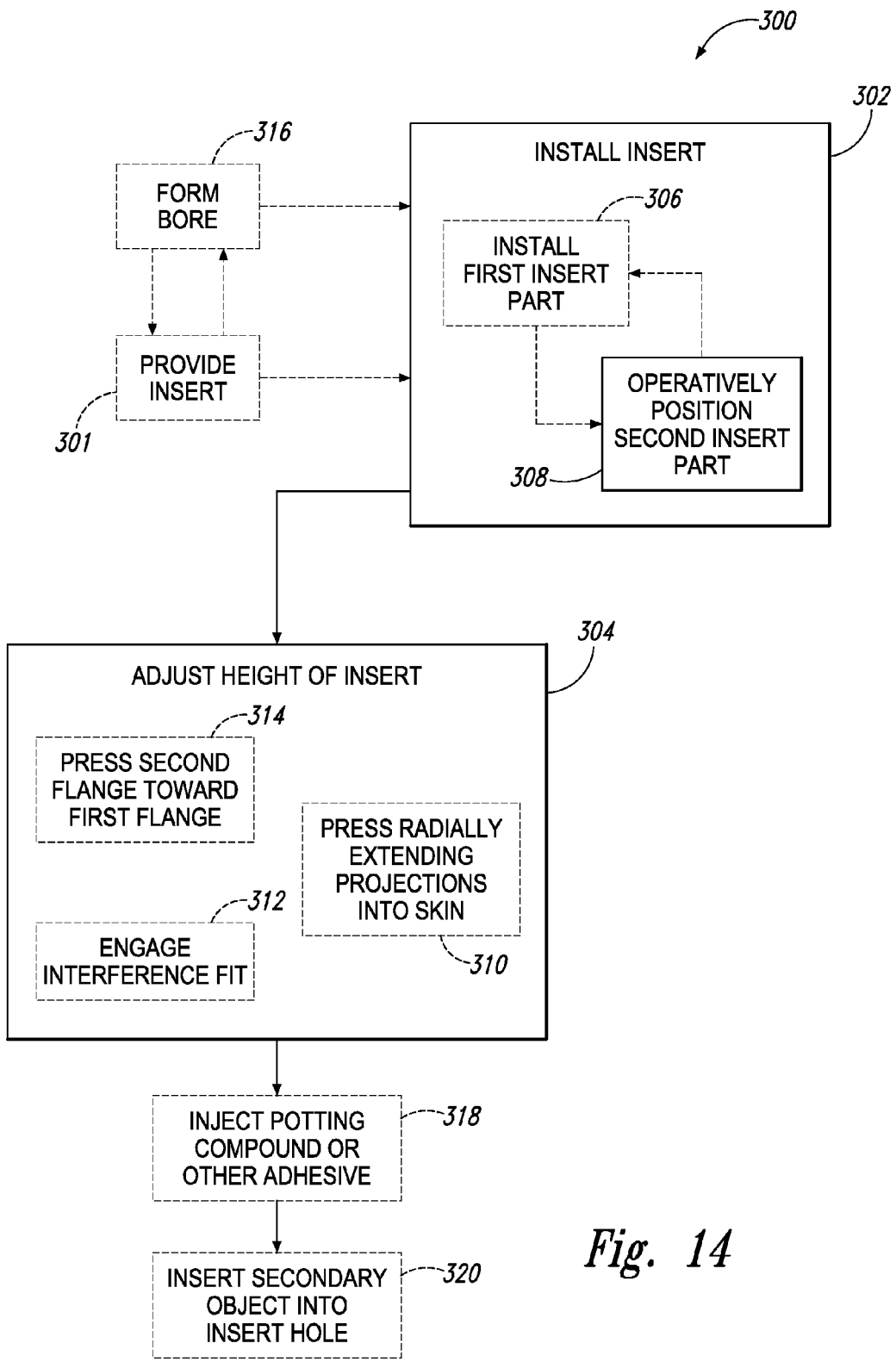
FIG. 14 is a schematic flow chart diagram, representing methods of installing and adjusting the height of one or more adjustable-height inserts, according to the present disclosure.

FIG. 14 schematically provides a flowchart that represents illustrative, non-exclusive examples of methods 300 according to the present disclosure. In FIG. 14, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 14 are not limiting and other methods and steps are within the scope of the present disclosure, including methods having greater than or fewer than the number of steps illustrated, as understood from the discussions herein.

As shown in FIG. 14, methods 300 according to the present disclosure may generally include providing an adjustable-height insert (e.g., adjustable-height insert 50) at 301, installing the adjustable-height insert into a sandwich panel (e.g., into bore 20 of sandwich panel 12) at 302, and/or adjusting the height of the adjustable-height insert at 304. In some methods 300, installing an adjustable-height insert at 302 may include installing a plurality of respective adjustable-height inserts into a plurality of respective bores formed in one or more sandwich panels. Installing the adjustable-height insert at 302 may include installing a first insert part (e.g., first insert part 52) in a respective bore at 306 such that at least a portion of a first neck (e.g., first neck 64) of the first insert part is positioned within the bore, and operatively positioning a second insert part (e.g., second insert part 54) with respect to the first insert part at 308. In some methods, operatively positioning the second insert part at 308 may include installing the second insert part in the respective bore such that at least a portion of a second neck (e.g., second neck 78) of the second insert part is positioned within the bore.

In some methods, installing the first insert part in the bore at 306 may be performed prior to operatively positioning the second insert part with respect to the first insert part at 308 (e.g., the first insert part may be positioned within the bore and then the second insert part may be positioned within the bore). For example, installing the first insert part at 306 may include positioning the first insert part within the bore such that a first flange (e.g., first flange 58) of the first insert part is positioned adjacent a base of the bore (e.g., base 105 of bore 20) or a skin of the sandwich panel (e.g., first skin 16 or second skin 18), such that the first neck extends into the bore, away from the base of the bore or the respective panel skin. Once the first insert part is so positioned, in some methods, the second insert part may be positioned such that the second neck is positioned between the first flange of the first insert part and a second flange (e.g. second flange 72) of the second insert part (e.g., the second neck may extend into the bore, towards the base of the bore and/or towards the respective panel skin).

In some methods, installing the first insert part in the bore at 306 may be performed after operatively positioning the second insert part with respect to the first insert part at 308 (e.g., the second part may be operatively positioned, such as positioned at least partially onto the first insert part, and then the assembly of the first insert part and the second insert part may together be inserted into the bore of the sandwich panel). In some methods, operatively positioning the second insert part with respect to the first insert part may include positioning the second insert part such that a second hole (e.g., second hole 80) of the second insert part is at least substantially concentric with a first hole (e.g., first hole 66) of the first insert part.

Adjusting the height of the adjustable-height insert at 304 may include adjusting the height until a plurality of radially-extending projections (e.g., radially-extending projections 94) engage the sandwich panel at 310 (e.g., until the radially-extending projections are pressed into a skin of the sandwich panel, such as first skin 16 or second skin 18 of sandwich panel 12), until an interference fit is engaged at 312, and/or until a second upper surface of the second flange (e.g., second upper surface 74 of second flange 72) of the second insert part is at least substantially flush with an outer surface of the sandwich panel (e.g., first outer panel surface 31 or second outer panel surface 35). In some methods, engaging an interference fit at 312 may include engaging an interference fit between the first insert part and the second insert part, such as between the first neck of the first insert part and the second neck of the second insert part. Adjusting the height of the adjustable-height insert at 304 may include pressing the second flange of the second insert part towards the first flange of the first insert part at 314. For example, a force may be applied to the second insert part (e.g., to a second upper surface, such as second upper surface 74, of the second flange of the second insert part) such that the second insert part is moved with respect to the first insert part, and the second flange moves towards the first flange, thereby reducing an overall height of the adjustable-height insert. In some methods 300, pressing the second flange of the second insert part towards the first flange of the first insert part at 314 may include moving the second neck of the second insert part with respect to and towards the first flange of the first insert part.

Some methods 300 may include forming at least one bore in a sandwich panel at 316. Forming a bore at 316 may include forming a plurality of bores in a given sandwich panel. Forming a bore at 316 may include forming a bore that extends through one or both of a first skin (e.g. first skin 16) and a second skin (e.g. second skin 18) of the sandwich panel, as well as through at least a portion of a core (e.g. core 14) of the sandwich panel. In some methods 300, forming at least one bore at 316 may be automated. Forming at least one bore at 316 may include forming at least one blind bore (e.g., a bore that extends through only one skin and only partially through the core of the sandwich panel) and/or may include forming at least one through bore (e.g., a bore that extends through both skins and through the entire core of the sandwich panel). Forming at least one bore at 316 may include drilling, milling, and/or punching in some methods 300. In some methods 300, forming at least one bore at 316 may include forming at least one bore having a circular cross-sectional area. Additionally or alternatively, forming at least one bore at 316 may include forming at least one bore having a non-circular cross-sectional area, such as at least one bore having a polygonal, elliptical, and/or irregularly-shaped cross-sectional area.

Methods 300 may include injecting a potting compound or other adhesive at 318 into a space (e.g., space 98) between the bore and the adjustable-height insert. Injecting the potting compound at 318 may be performed after the adjustable-height insert is positioned within the bore (e.g., after the second insert part is operatively positioned with respect to the first insert part) and after the height of the adjustable-height insert has been adjusted. For example, potting compound may be injected through one or more vents (e.g., vents 106) formed in the second insert part, such that potting compound is placed within the bore, adjacent the second neck of the second insert part. Injecting potting compound at 318 may include injecting a potting compound, injecting a quick-cure adhesive, injecting a UV-cure adhesive, and/or injecting any other compound configured to increase security of the adjustable-height insert within the bore. In some methods 300, injecting a potting compound at 318 may include injecting a potting compound such that it is adjacent an anti-rotation feature (e.g., anti-rotation feature 96) of the adjustable-height insert, such as adjacent a textured outer surface of the second neck (e.g., second outer surface 100 of second neck 78).

Additionally or alternatively, methods 300 may include inserting a secondary object (e.g., secondary object 92) at 320 through the adjustable-height insert (e.g., through a first hole (e.g. first hole 66) and a second hole (e.g. second hole 80) of the adjustable-height insert). The secondary object may include a fastener, a bolt, a pin, a wire, and/or any object or structure that may be configured to transfer a localized load to the sandwich panel via the adjustable-height insert.

Any number of adjustable-height inserts may be installed in a given sandwich panel in methods 300 according to the present disclosure. In some methods 300, the adjustable-height inserts may be configured for tool-less installations (e.g., the inserts may be installed at 302 and their height adjusted at 304, without requiring the use of tools). In some methods, installing the adjustable-height insert at 302 and/or adjusting the height of the adjustable-height insert at 304 may be automated. In some methods 300, at least one adjustable-height insert may be installed adjacent one side of a sandwich panel (e.g., adjacent the first skin), and at least one adjustable-height insert may be installed adjacent the opposite side of the sandwich panel (e.g., adjacent the second skin). In some methods 300, a plurality of adjustable-height inserts may be installed via just one side of a sandwich panel, and the heights of the inserts may be adjusted without requiring access to the opposite side of the sandwich panel. In some methods 300, a plurality of sizes of adjustable-height inserts may be installed such that they are flush within a larger plurality of sizes of bores.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

Illustrative, non-exclusive examples of inventive subject matter according to the present disclosure are described in the following enumerated paragraphs:

A1. An adjustable-height insert, comprising:
a first insert part, comprising:
a first flange having a first upper surface and a first lower surface;
a first neck extending from the first upper surface of the first flange; and
a first hole extending at least through the first neck and defined at least partially by a first inner surface of the first neck, wherein the first neck comprises a first outer surface opposite the first inner surface; and
a second insert part, comprising:
a second flange having a second upper surface and a second lower surface;
a second neck extending from the second lower surface of the second flange; and
a second hole extending through the second neck and the second flange, wherein the second hole is partially defined by a second inner surface of the second neck;
wherein the second insert part is configured to be selectively operatively positioned with respect to the first insert part such that the second inner surface of the second neck engages the first outer surface of the first neck with an interference fit, wherein the adjustable-height insert is configured to have a selectively adjustable overall height such that moving the second insert part with respect to the first insert part such that the second flange is moved towards the first flange reduces the overall height of the adjustable-height insert, wherein the overall height of the adjustable-height insert is defined as the perpendicular distance between the second upper surface of the second flange and the first lower surface of the first flange, and wherein the first hole and the second hole are at least substantially concentric when the second insert part is operatively positioned with respect to the first insert part.

A1.1 The adjustable-height insert of paragraph A1, further comprising a plurality of radially-extending projections extending from the second flange, adjacent the second upper surface of the second flange.

A1.2. The adjustable-height insert of paragraph A1 or A1.1 wherein the adjustable-height insert is configured to receive a secondary object within the first hole and the second hole, the secondary object being configured to transfer a localized load to a sandwich panel in which the adjustable-height insert is installed, via the adjustable-height insert.

A1.3. The adjustable-height insert of any of paragraphs A1-A1.2, wherein the adjustable-height insert is configured to be installed in a bore of a/the sandwich panel, the sandwich panel comprising a first skin, a second skin opposite the first skin, and a core therebetween.

A2. The adjustable-height insert of any of paragraphs A1-A1.3, further comprising an anti-rotation feature configured to resist rotation of the adjustable-height insert with respect to a/the sandwich panel once the adjustable-height insert is fully inserted in the sandwich panel and a potting compound is injected into a/the bore in the sandwich panel.

A3. The adjustable-height insert of paragraph A2, wherein the anti-rotation feature comprises a textured surface.

A4. The adjustable-height insert of paragraph A3, wherein the second insert part includes the textured surface.

A5. The adjustable-height insert of paragraph A4, wherein the textured surface forms at least a portion of the second neck of the second insert part.

A6. The adjustable-height insert of any of paragraphs A1-A5, wherein the first hole extends through the first flange.

A7. The adjustable-height insert of any of paragraphs A1-A6, wherein a/the plurality of radially-extending projections are spaced apart, about a peripheral edge of the second flange.

A7.1. The adjustable-height insert of any of paragraphs A1-A7, wherein at least some of a/the plurality of radially-extending projections are non-parallel to a longitudinal axis of the second flange.

A7.2. The adjustable-height insert of any of paragraphs A1-A7.1, wherein each respective radially-extending projection of a/the plurality of radially-extending projections has a respective maximum width and a respective height, and wherein at least some of the plurality of radially-extending projections have a respective maximum width that is greater than the respective height of the respective radially-extending projection.

A7.3. The adjustable-height insert of any of paragraphs A1-A7.2, wherein at least some of a/the plurality of radially-extending projections extend along only a portion of a/the height of the second flange.

A7.4. The adjustable-height insert of any of paragraphs A1-A7.3, wherein at least some of a/the plurality of radially-extending projections extend along less than half of a/the height of the second flange.

A7.5. The adjustable-height insert of any of paragraphs A1-A7.4, wherein at least some of a/the plurality of radially-extending projections are positioned such that they are adjacent the second upper surface of the second flange, but not adjacent the second lower surface of the second flange.

A7.6. The adjustable-height insert of any of paragraphs A1-A7.5, wherein at least some of a/the plurality of radially-extending projections are wider adjacent the second upper surface of the second flange, and narrow as they extend towards the second lower surface of the second flange.

A7.7. The adjustable-height insert of any of paragraphs A1-A7.6, wherein at least one respective radially-extending projection of a/the plurality of radially-extending projections converges to a respective point located on a/the circumferential surface of the second flange.

A7.8. The adjustable-height insert of any of paragraphs A1-A7.7, wherein at least one respective radially-extending projection of a/the plurality of radially-extending projections is substantially triangular.

A8. The adjustable-height insert of any of paragraphs A1-A7.8, wherein the adjustable-height insert is configured such that a/the plurality of radially-extending projections engage one of a/the first skin and a/the second skin of a/the sandwich panel when the second insert part is operatively positioned with respect to the first insert part and the adjustable-height insert is installed in a/the bore of the sandwich panel.

A9. The adjustable-height insert of any of paragraphs A1-A8, wherein the adjustable-height insert is configured such that a/the plurality of radially-extending projections engage a/the core of a/the sandwich panel when the second insert part is operatively positioned with respect to the first insert part and the adjustable-height insert is installed in a/the bore of the sandwich panel.

A10. The adjustable-height insert of any of paragraphs A1-A9, wherein the adjustable-height insert is configured such that the second upper surface of the second flange is at least substantially flush with one of a/the first skin and a/the second skin of a/the sandwich panel when the second insert part is operatively positioned with respect to the first insert part and the adjustable-height insert is installed in a/the bore of the sandwich panel.

A10.1. The adjustable-height insert of any of paragraphs A1-A10, wherein the adjustable-height insert is configured to at least substantially maintain its overall height, once adjusted such that the second upper surface of the second flange is at least substantially flush with a/the sandwich panel and/or such that a/the plurality of radially-extending projections engage a/the core of the sandwich panel when the second insert part is operatively positioned with respect to the first insert part and the adjustable-height insert is installed in a/the bore of the sandwich panel.

A11. The adjustable-height insert of any of paragraphs A1-A10.1, wherein a/the plurality of radially-extending projections are configured to prevent the second upper surface of the second flange from being positioned sub-flush with respect to one of a/the first skin and a/the second skin of a/the sandwich panel when the second insert part is operatively positioned with respect to the first insert part and the adjustable-height insert is installed in a/the bore of the sandwich panel.

A12. The adjustable-height insert of any of paragraphs A1-A11, wherein a/the plurality of radially-extending projections comprises at least two radially-extending projections, at least three radially-extending projections, at least four radially-extending projections, at least five radially-extending projections, at least six radially-extending projections, at least seven radially-extending projections, at least eight radially-extending projections, at least nine radially-extending projections, and/or at least ten radially-extending projections.

A13. The adjustable-height insert of any of paragraphs A1-A12, wherein each of a/the plurality of radially-extending projections extends from a circumferential surface of the second flange at a non-parallel angle.

A14. The adjustable-height insert of paragraph A13, wherein the non-parallel angle is obtuse.

A15. The adjustable-height insert of any of paragraphs A1-A14, wherein the second flange is tapered such that a first diameter of the second flange adjacent the second upper surface is greater than a second diameter of the second flange adjacent the second lower surface.

A16. The adjustable-height insert of any of paragraphs A1-A15, wherein each of a/the plurality of radially-extending projections comprises a top projecting surface and an angled surface, wherein the top projecting surface is at least substantially parallel to the second upper surface of the second flange, and wherein the top projecting surface forms a projection angle with the angled surface.

A17. The adjustable-height insert of paragraph A16, wherein the projection angle is acute.

A18. The adjustable-height insert of paragraph A16 or A17, wherein the top projecting surface is continuous with the second upper surface of the second flange.

A19. The adjustable-height insert of any of paragraphs A1-A18, wherein the adjustable-height insert is configured such that the overall height of the adjustable-height insert is adjustable once the first insert part and the second insert part are at least partially inserted into a/the bore of a/the sandwich panel.

A20. The adjustable-height insert of any of paragraphs A1-A19, wherein the first insert part and the second insert part are polymeric.

A21. The adjustable-height insert of any of paragraphs A1-A20, wherein the adjustable-height insert is configured such that the overall height is adjustable between a minimum height and a maximum height, and wherein the difference between the minimum height and the maximum height is at least 0.05 inches (in) (1.27 millimeters (mm)), at least 0.10 in (2.54 mm), at least 0.15 in (3.81 mm), at least 0.20 in (5.08 mm), at least 0.30 in (7.62 mm), at least 0.40 in (10.16 mm), at least 0.5 in (12.7 mm), at least 0.6 in (15.24 mm), at least 0.7 in (17.78 mm), at least 0.8 in (20.32 mm), at least 0.9 in (22.86 mm), and/or at least 1.0 in (25.4 mm).

A22. The adjustable-height insert of any of paragraphs A1-A21, wherein the adjustable-height insert is configured such that the overall height is adjustable between a/the minimum height and a/the maximum height, and wherein the difference between the minimum height and the maximum height is at least 10% of the maximum height, at least 15% of the maximum height, at least 20% of the maximum height, at least 25% of the maximum height, at least 30% of the maximum height, at least 35% of the maximum height, at least 40% of the maximum height, at least 45% of the maximum height, and/or at least 50% of the maximum height.

A23. The adjustable-height insert of any of paragraphs A1-A22, wherein the adjustable-height insert is configured such that the overall height is adjustable via applying a force to the second insert part, thereby moving the second flange towards the first flange.

A24. The adjustable-height insert of any of paragraphs A1-A23, wherein the adjustable-height insert is configured such that the overall height is adjustable without requiring access to the first flange of the first insert part.

A25. The adjustable-height insert of any of paragraphs A1-A24, wherein the adjustable-height insert is configured to be inserted into a/the sandwich panel when only one of a/the first skin and a/the second skin is accessible.

A25.1. The adjustable-height insert of any of paragraphs A1-A25, wherein a/the first diameter of the second flange, adjacent the second upper surface, is slightly smaller than a bore diameter of a/the bore in a/the sandwich panel.

A26. The adjustable-height insert of any of paragraphs A1-A25, wherein a/the first diameter of the second flange, adjacent the second upper surface, is approximately equal to a bore diameter of a/the bore in a/the sandwich panel.

B1. A sandwich panel, comprising:
a first skin having a first inner surface and a first outer surface opposite the first inner surface;
a second skin opposite the first skin, the second skin having a second inner surface and a second outer surface opposite the second inner surface, and the first outer surface and the second outer surface facing away from one another;
a core sandwiched between the first inner surface of the first skin and the second inner surface of the second skin;
at least one bore formed in at least one of the first skin and the second skin, and extending into the core; and
at least one adjustable-height insert, each adjustable-height insert of the at least one adjustable-height inserts being the adjustable-height insert of any of paragraphs A1-A26 installed in a respective bore of the at least one bores of the sandwich panel.

B1.1. The sandwich panel of paragraph B1, wherein at least one of the at least one bores is formed in the first skin and extends into the core towards the second skin.

B1.2. The sandwich panel of paragraph B1 or B1.1, wherein at least one of the at least one bores is formed in the second skin and extends into the core towards the first skin.

B2. The sandwich panel of any of paragraphs B1-B1.2, wherein the at least one adjustable-height insert comprises a plurality of adjustable-height inserts, wherein each adjustable-height insert of the plurality of adjustable-height inserts is installed in a respective one of the at least one bores.

B3. The sandwich panel of any of paragraphs B1-B2, wherein the core comprises one or more of foam, aluminum, Nomex® (aramid), carbon, Korex, Kevlar®, fiberglass, polyethersulfone, polyvinylchloride, polyurethane, polyethylene foam, polystyrene foam, balsa wood, syntactic foam, a honeycomb structure, a polymer honeycomb, a thermoplastic honeycomb, stainless steel, polycarbonate, and polypropylene.

B4. The sandwich panel of any of paragraphs B1-B3, wherein the first skin comprises one or more of a laminate of fiber-reinforced polymer, a thermoset polymer, an epoxy, sheet metal, carbon, aramid, aluminum, steel, plywood, balsa, teak, and hardwood.

B5. The sandwich panel of any of paragraphs B1-B4, wherein the second skin comprises one or more of a laminate of fiber-reinforced polymer, a thermoset polymer, an epoxy, sheet metal, carbon, aramid, aluminum, steel, plywood, balsa, teak, and hardwood.

B6. The sandwich panel of any of paragraphs B1-B5, wherein the sandwich panel comprises a composite panel.

B7. The sandwich panel of any of paragraphs B1-B6, wherein the core comprises a honeycomb core.

B7.1. The sandwich panel of any of paragraphs B1-B7, wherein the core comprises a closed-cell structure.

B7.2. The sandwich panel of any of paragraphs B1-B7.1, wherein the core comprises an open-cell structure.

B8. The sandwich panel of any of paragraphs B1-B7.2, wherein at least some of a/the plurality of radially-extending projections of at least one of the at least one adjustable-height inserts is engaged with the first skin.

B9. The sandwich panel of any of paragraphs B1-B8, wherein at least some of a/the plurality of radially-extending projections of at least one of the at least one adjustable-height inserts is engaged with the second skin.

1310. The sandwich panel of any of paragraphs B1-B9, wherein an opposing end of at least one of the at least one adjustable-height inserts is embedded within the core of the sandwich panel.

B11. The sandwich panel of any of paragraphs B1-B10, wherein the second upper surface of the second flange of at least one of the at least one adjustable-height inserts is at least substantially flush with the first outer surface of the first skin.

B11.1. The sandwich panel of paragraph B11, wherein the first lower surface of the first flange of at least one of the at least one adjustable-height inserts is at least substantially flush with the second outer surface of the second skin.

B12. The sandwich panel of any of paragraphs B1-B11.1, wherein the second upper surface of the second flange of at least one of the at least one adjustable-height inserts is at least substantially flush with the second outer surface of the second skin.

B12.1. The sandwich panel of paragraph B12, wherein the first lower surface of the first flange of at least one of the at least one adjustable-height inserts is at least substantially flush with the first outer surface of the first skin.

B13. The sandwich panel of any of paragraphs B1-B12.1, wherein the at least one bore comprises a plurality of bores, each respective bore of the plurality of bores extending from at least one of the first skin and the second skin, and into the core, wherein the at least one adjustable-height insert comprises a plurality of adjustable-height inserts, and wherein at least one of the plurality of adjustable-height inserts is installed within each respective bore of the plurality of bores.

B14. The sandwich panel of any of paragraphs B1-B13, wherein each bore of the at least one bores comprises a substantially cylindrical bore formed at least partly through the core.

B15. The sandwich panel of any of paragraphs B1-B14, further comprising one or more of a potting compound, a quick cure compound, and a UV cure compound inserted between the core of the sandwich panel and the second neck of at least one of the at least one adjustable-height inserts.

B16. The sandwich panel of any of paragraphs B1-B15, further comprising one or more of a/the potting compound, a/the quick cure compound, and a/the UV cure compound inserted between the core of the sandwich panel and a/the anti-rotation feature of at least one of the at least one adjustable-height inserts.

C1. An apparatus including at least one sandwich panel according to any of paragraphs B1-B16.

C2. The apparatus of paragraph C1, wherein the apparatus comprises one or more of an aircraft, a satellite, an antenna, a transit vehicle, a shipping container, an automobile, and a shelter.

C3. The apparatus of any of paragraphs C1-C2, wherein the sandwich panel forms a portion of one or more of a floor, a galley, an interior main structure, a secondary structure, an interior wall, a stow bin, an overhead compartment, a lavatory, a capsule panel, a nose cone, an instrumentation enclosure, a bulkhead panel, a curtain wall, a partition, and a divider panel in the apparatus.

D1. A method of installing an adjustable-height insert into a sandwich panel, the method comprising:

installing at least one adjustable-height insert of any of paragraphs A1-A26 into a respective one of at least one bores in the sandwich panel such that at least a portion of the first neck and at least a portion of the second neck of the adjustable-height insert are positioned within the respective bore in a core of the sandwich panel; and adjusting a height of the adjustable-height insert until a/the plurality of radially-extending projections of the adjustable-height insert engage the sandwich panel and/or until the second upper surface of the second flange is at least substantially flush with an outer surface of the sandwich panel.

D1.1 The method of paragraph D1, further comprising forming the at least one bore in the sandwich panel, the sandwich panel having a first skin having a first inner surface and an opposite first outer surface, a second skin opposite the first skin, the second skin having a second inner surface and an opposite second outer surface, the first outer surface and the second outer surface facing away from one another, and the core being sandwiched between the first inner surface of the first skin and the second inner surface of the second skin, wherein the forming the at least one bore comprises forming at least one bore such that it extends through at least one of the first skin and the second skin, and into the core.

D1.2. The method of paragraph D1.1, wherein the forming the at least one bore in the sandwich panel is automated.

D2. The method of paragraph D1.1 or D1.2, wherein the forming the at least one bore comprises forming at least one blind bore that extends only partially into a thickness of the core of the sandwich panel.

D3. The method of any of paragraphs D1.1-D2, wherein the forming the at least one bore comprises forming a plurality of blind bores in the sandwich panel.

D4. The method of any of paragraphs D1.1-D3, wherein the forming the at least one bore comprises forming at least one through-bore that extends through the first skin, the second skin, and a/the thickness of the core of the sandwich panel.

D5. The method of any of paragraphs D1.1-D4, wherein the forming the at least one bore comprises one or more of drilling, milling, and punching.

D6. The method of any of paragraphs D1.1-D5, wherein the forming the at least one bore comprises forming at least one circular bore through at least a portion of a/the thickness of the core of the sandwich panel.

D7. The method of any of paragraphs D1.1-D6, wherein the forming the at least one bore comprises forming a plurality of bores, and wherein the installing at least one adjustable-height insert comprises installing a plurality of adjustable-height inserts, each respective adjustable-height insert of the plurality of adjustable-height inserts being installed into a respective bore of the plurality of bores.

D7.1. The method of any of paragraphs D1-D7, wherein the plurality of radially-extending projections of at least one of the at least one adjustable-height inserts engage a/the first skin of the sandwich panel.

D7.2. The method of any of paragraphs D1-D7.1, wherein the plurality of radially-extending projections of at least one of the at least one adjustable-height inserts engage a/the second skin of the sandwich panel.

D8. The method of any of paragraphs D1-D7.2, further comprising inserting at least one secondary object within the respective first hole and second hole of a respective adjustable-height insert of the at least one adjustable-height inserts, the at least one secondary object being configured to transfer a localized load to the sandwich panel via the adjustable-height insert.

D9. The method of any of paragraphs D1-D8, further comprising injecting one or more of a potting compound, a quick-cure adhesive, and a UV-cure adhesive into a space between the second neck of the adjustable-height insert and the core of the sandwich panel, inside the respective bore.

D9.1. The method of any of paragraphs D1-D9, comprising injecting one or more of a/the potting compound, a/the quick-cure adhesive, and a/the UV-cure adhesive into a respective one of the at least one bores, adjacent a/the anti-rotation feature of the adjustable-height insert.

D10. The method of any of paragraphs D1-D9.1, wherein the installing the at least one adjustable-height insert into the respective one of the at least one bores is automated.

D11. The method of any of paragraphs D1-D10, wherein the installing the at least one adjustable-height insert into a/the respective one of the at least one bores comprises operatively positioning the second insert part with respect to the first insert part.

D11.1. The method of paragraph D11, wherein the installing the at least one adjustable-height insert comprises first inserting the first insert part into the respective bore and then inserting the second insert part into the respective bore such that the second inner surface of the second neck is at least partially positioned on the first outer surface of the first neck.

D12. The method of any of paragraphs D1-D11.1, wherein the installing the at least one adjustable-height insert into a/the respective one of the at least one bores comprises inserting the second insert part with respect to the first insert part such that the first hole and the second hole are substantially concentric.

D13. The method of any of paragraphs D1-D12, wherein the installing the at least one adjustable-height insert into a/the respective one of the at least one bores comprises positioning the first flange adjacent a base of the bore, such that the first neck extends into the bore from within the bore.

D13.1. The method of any of paragraphs D1-D13, wherein the installing the at least one adjustable-height insert into a/the respective one of the at least one bores comprises positioning the first flange adjacent a/the first skin or a/the second skin of the sandwich panel, such that the first neck extends into the bore and towards the other of the first skin and the second skin.

D14. The method of any of paragraphs D1-D13.1, wherein the installing the at least one adjustable-height insert into a/the respective one of the at least one bores comprises positioning the second insert part such that the second neck is positioned between the first flange of the first insert part and the second flange of the second insert part.

D15. The method of any of paragraphs D1-D14, wherein the adjusting the height of the adjustable-height insert comprises adjusting the height of the adjustable-height insert until the second upper surface of the second flange is at least substantially flush with an outer surface of one of a/the first skin and a/the second skin of the sandwich panel.

D16. The method of any of paragraphs D1-D15, wherein the adjusting the height of the adjustable-height insert comprises moving the second flange with respect to and towards the first flange.

D17. The method of any of paragraphs D1-D16, wherein the adjusting the height of the adjustable-height insert comprises moving the second neck with respect to and towards the first flange.

D18. The method of any of paragraphs D1-D17, wherein the adjusting the height of the adjustable-height insert comprises engaging an interference fit between the first neck and the second neck.

D19. The method of any of paragraphs D1-D18, wherein the adjusting the height of the adjustable-height insert comprises pressing the plurality of radially-extending projections of at least one adjustable-height insert into a/the first skin of the sandwich panel.

D20. The method of any of paragraphs D1-D19, wherein the adjusting the height of the adjustable-height insert comprises pressing the plurality of radially-extending projections of at least one adjustable-height insert into a/the second skin of the sandwich panel.

D21. The method of any of paragraphs D1-D18, wherein the adjusting the height of the adjustable-height insert comprises reducing an overall height of the adjustable-height insert.

E1. Use of the adjustable-height insert of any of paragraphs A1-A26 to receive a secondary object within the first hole and the second hole of the adjustable-height insert, to transfer a/the localized load to a/the sandwich panel via the adjustable-height insert when the adjustable-height insert is installed within the sandwich panel.

F1. Use of the sandwich panel of any of paragraphs B1-B16 to construct a portion of one or more of an aircraft, a satellite, an antenna, a transit vehicle, a shipping container, an automobile, and a shelter.

G1. A system, comprising:
a plurality of first adjustable-height inserts, wherein each first adjustable-height insert of the plurality of first adjustable-height inserts comprises an adjustable-height insert of any of paragraphs A1-A26 having a first minimum overall height and a first maximum overall height when the respective second insert part is operatively positioned with respect to the respective first insert part of each respective first adjustable-height insert; and
a plurality of second adjustable-height inserts, wherein each second adjustable-height insert of the plurality of second adjustable-height inserts comprises an adjustable-height insert of any of paragraphs A1-A26 having a second minimum overall height and a second maximum overall height when the respective second insert part is operatively positioned with respect to the respective first insert part of each respective second adjustable-height insert, wherein the second minimum overall height of each second adjustable-height insert is greater than the first minimum overall height of each first adjustable-height insert, and wherein the second maximum overall height of each second adjustable-height insert is greater than the first maximum overall height of each first adjustable-height insert.

G2. The system of paragraph G1, wherein a second adjustment range of each second adjustable-height insert is greater than a first adjustment range of each first adjustable-height insert, wherein the second adjustment range is defined as the difference between the second maximum overall height and the second minimum overall height, and wherein the first adjustment range is defined as the difference between the first maximum overall height and the first minimum overall height.

G3. The system of paragraph G1 or G2, further comprising a plurality of third adjustable-height inserts, wherein each third adjustable-height insert of the plurality of third adjustable-height inserts comprises an adjustable-height insert of any of paragraphs A1-A26 having a third minimum overall height and a third maximum overall height when the respective second insert part is operatively positioned with respect to the respective first insert part of each respective third adjustable-height insert, wherein the third minimum overall height of each third adjustable-height insert is greater than the second minimum overall height of each second adjustable-height insert, and wherein the third maximum overall height of each third adjustable-height insert is greater than the second maximum overall height of each second adjustable-height insert.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An adjustable-height insert, comprising:
    a first insert part comprising:
        a first flange having a first upper surface and a first lower surface;
        a first neck extending from the first upper surface of the first flange; and
        a first hole extending at least through the first neck and defined at least partially by a first inner surface of the first neck, wherein the first neck comprises a first outer surface opposite the first inner surface; and
    a second insert part comprising:
        a second flange having a second upper surface and a second lower surface;
        a second neck extending from the second lower surface of the second flange;
        a second hole extending through the second neck and the second flange, wherein the second hole is partially defined by a second inner surface of the second neck; and
        a plurality of radially-extending projections extending from the second flange, adjacent the second upper surface of the second flange, wherein the plurality of radially-extending projections are spaced apart about a peripheral edge of the second flange, and wherein at least some of the plurality of radially-extending projections extend along less than half of a height of the second flange,
    wherein the second insert part is configured to be selectively operatively positioned with respect to the first insert part such that the second inner surface of the second neck engages the first outer surface of the first neck with an interference fit, wherein the adjustable-height insert is configured to have a selectively adjustable overall height such that moving the second insert part with respect to the first insert part such that the second flange is moved towards the first flange reduces the overall height of the adjustable-height insert, wherein the overall height of the adjustable-height insert is defined as the perpendicular distance between the second upper surface of the second flange and the first lower surface of the first flange, and wherein the first hole and the second hole are at least substantially concentric when the second insert part is operatively positioned with respect to the first insert part.

2. The adjustable-height insert according to claim 1, wherein the adjustable-height insert is configured to be installed within a bore of a sandwich panel, and wherein the adjustable-height insert further comprises an anti-rotation feature configured to resist rotation of the adjustable-height insert with respect to the sandwich panel once the adjustable-height insert is installed in the bore of the sandwich panel and a potting compound is injected into the bore.

3. The adjustable-height insert according to claim 2, wherein the anti-rotation feature comprises a textured surface and wherein the textured surface forms at least a portion of the second neck of the second insert part.

4. The adjustable-height insert according to claim 1, wherein the first hole extends through the first flange.

5. The adjustable-height insert according to claim 1, wherein each respective radially-extending projection of the plurality of radially-extending projections has a respective maximum width and a respective height, and wherein at least some of the plurality of radially-extending projections have a respective maximum width that is greater than the respective height of the respective radially-extending projection.

6. The adjustable-height insert according to claim 1, wherein the adjustable-height insert is configured to be installed in a bore of a sandwich panel, the sandwich panel comprising a first skin, a second skin opposite the first skin, and a core therebetween, and wherein the adjustable-height insert is configured such that the plurality of radially-extending projections engage one of the first skin and the second skin of the sandwich panel when the second insert part is operatively positioned with respect to the first insert part and the adjustable-height insert is installed in the bore of the sandwich panel.

7. The adjustable-height insert according to claim 6, wherein the adjustable-height insert is configured such that the second upper surface of the second flange is at least substantially flush with one of the first skin and the second skin of the sandwich panel when the second insert part is operatively positioned with respect to the first insert part and the adjustable-height insert is installed in the bore of the sandwich panel.

8. The adjustable-height insert according to claim 6, wherein the plurality of radially-extending projections are configured to prevent the second upper surface of the second flange from being positioned sub-flush with respect to one of the first skin and the second skin of the sandwich panel when the second insert part is operatively positioned with respect to the first insert part and the adjustable-height insert is installed in the bore of the sandwich panel.

9. The adjustable-height insert according to claim 1, wherein the second flange is tapered such that a first diameter of the second flange adjacent the second upper surface is greater than a second diameter of the second flange adjacent the second lower surface.

10. The adjustable-height insert according to claim 9, wherein the first diameter of the second flange, adjacent the second upper surface, is slightly smaller than a bore diameter of a bore in a sandwich panel in which the adjustable-height insert is configured to be installed.

11. The adjustable-height insert according to claim 1, wherein each radially-extending projection of the plurality of radially-extending projections comprises a top projecting surface and an angled surface, wherein the top projecting surface is at least substantially parallel to the second upper surface of the second flange, wherein the top projecting surface forms a projection angle with the angled surface, and wherein the projection angle is acute.

12. The adjustable-height insert according to claim 1, wherein the adjustable-height insert is configured such that the overall height of the adjustable-height insert is adjustable once the first insert part and the second insert part are at least partially inserted into a bore of a sandwich panel.

13. A sandwich panel, comprising:
   a first skin having a first inner surface and a first outer surface opposite the first inner surface;
   a second skin opposite the first skin, the second skin having a second inner surface and a second outer surface opposite the second inner surface, and the first outer surface and the second outer surface facing away from one another;
   a core sandwiched between the first inner surface of the first skin and the second inner surface of the second skin;
   at least one bore formed in at least one of the first skin and the second skin, and extending into the core; and
   at least one adjustable-height insert according to claim 1, each adjustable-height insert of the at least one adjustable-height inserts being installed in a respective bore of the sandwich panel.

14. A method of installing an adjustable-height insert into a bore formed in a sandwich panel, the method comprising:
   installing an adjustable-height insert into the bore, wherein the adjustable-height insert comprises:
      a first insert part comprising:
         a first flange having a first upper surface and a first lower surface;
         a first neck extending from the first upper surface of the first flange; and
         a first hole extending at least through the first neck and defined at least partially by a first inner surface of the first neck, wherein the first neck comprises a first outer surface opposite the first inner surface; and
      a second insert part comprising:
         a second flange having a second upper surface and a second lower surface; and
         a second neck extending from the second lower surface of the second flange;
         a second hole extending through the second neck and the second flange, wherein the second hole is partially defined by a second inner surface of the second neck; and
         a plurality of radially-extending projections extending from the second flange, adjacent the second upper surface of the second flange, wherein the plurality of radially-extending projections are spaced apart about a peripheral edge of the second flange, and wherein at least some of the plurality of radially-extending projections extend along less than half of a height of the second flange, wherein the second insert part is configured to be selectively operatively positioned with respect to the first insert part such that the second inner surface of the second neck engages the first outer surface of the first neck with an interference fit, wherein the adjustable-height insert is installed into the bore such that at least a portion of the first neck and at least a portion of the second neck of the adjustable-height insert are positioned within the bore of the sandwich panel; and
   adjusting a height of the adjustable-height insert until the plurality of radially-extending projections of the adjustable-height insert engage the sandwich panel and the second upper surface of the second flange is at least substantially flush with an outer surface of the sandwich panel.

15. The method according to claim 14, further comprising forming a plurality of bores in the sandwich panel, the sandwich panel having a first skin having a first inner surface and an opposite first outer surface, a second skin opposite the first skin, the second skin having a second inner surface and an opposite second outer surface, the first outer surface and the second outer surface facing away from one another, and a core sandwiched between the first inner surface of the first skin and the second inner surface of the second skin, wherein the forming the plurality of bores comprises forming the plurality of bores such that they extend through at least one of the first skin and the second skin and into the core, and wherein the installing the at least one adjustable-height insert comprises installing a plurality of adjustable-height inserts, each respective adjustable-height insert of the plurality of adjustable-height inserts being installed into a respective bore of the plurality of bores.

16. The method according to claim 14, wherein the installing the adjustable-height insert into the bore comprises positioning the first flange adjacent a second skin of the sandwich panel, such that the first neck extends into the bore towards a first skin of the sandwich panel, and positioning the second insert part such that the second neck is positioned between the first flange of the first insert part and the second flange of the second insert part.

17. The method according to claim 14, wherein the installing the adjustable-height insert into the bore comprises first inserting the first insert part into the bore and then inserting the second insert part into the bore such that the second inner surface of the second neck is at least partially positioned on the first outer surface of the first neck and such that the first hole and the second hole are substantially concentric.

18. The method according to claim 14, wherein the adjusting the height of the adjustable-height insert comprises adjusting the height of the adjustable-height insert until the plurality of radially-extending projections are pressed into one of a first skin and a second skin of the sandwich panel.

19. The method according to claim 14, wherein the adjusting the height of the adjustable-height insert comprises moving the second flange with respect to and towards the first flange and engaging an interference fit between the first neck and the second neck.

20. A system, comprising:
   a plurality of first adjustable-height inserts; and
   a plurality of second adjustable-height inserts, wherein each second adjustable-height insert of the plurality of second adjustable-height inserts and each first adjustable-height insert of the plurality of first adjustable-height inserts comprises:
      a first insert part comprising:
         a first flange having a first upper surface and a first lower surface;
         a first neck extending from the first upper surface of the first flange; and
         a first hole extending at least through the first neck and defined at least partially by a first inner surface of the first neck, wherein the first neck comprises a first outer surface opposite the first inner surface; and
      a second insert part comprising:
         a second flange having a second upper surface and a second lower surface; and
         a second neck extending from the second lower surface of the second flange;
         a second hole extending through the second neck and the second flange, wherein the second hole is partially defined by a second inner surface of the second neck; and a plurality of radially-extending projections extending from the second flange, adjacent the second upper surface of the second flange, wherein the plurality of radially-extending projections are spaced apart about a peripheral edge of the second flange, and wherein at least some of the plurality of radially-extending projections extend along less than half of a height of the second flange, and wherein the second insert part is configured to be positioned on the first insert part such that the second inner surface of the second neck engages the first outer surface of the first neck with an interference fit, wherein each respective first adjustable-height insert has a first minimum overall height and a first maximum overall height when the respective second insert part is operatively positioned with respect to the respective first insert part of each respective first adjustable-height insert, and wherein each respective second adjustable-height insert has a second minimum overall height and a second maximum overall height when the respective second insert part is operatively positioned with respect to the respective first insert part of each respective second adjustable-height insert, wherein the second minimum overall height of each second adjustable-height insert is greater than the first minimum overall height of each first adjustable-height insert, and wherein the second maximum overall height of each second adjustable-height insert is greater than the first maximum overall height of each first adjustable-height insert.

* * * * *